(12) United States Patent
Okita

(10) Patent No.: US 8,680,977 B2
(45) Date of Patent: Mar. 25, 2014

(54) ALARM SYSTEM AND ALARM METHOD FOR VEHICLE

(75) Inventor: Toshinori Okita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 356 days.

(21) Appl. No.: 12/084,883

(22) PCT Filed: May 11, 2007

(86) PCT No.: PCT/IB2007/001220
§ 371 (c)(1),
(2), (4) Date: May 12, 2008

(87) PCT Pub. No.: WO2007/132323
PCT Pub. Date: Nov. 22, 2007

(65) Prior Publication Data
US 2009/0237226 A1    Sep. 24, 2009

(30) Foreign Application Priority Data

May 12, 2006    (JP) ................... 2006-134321

(51) Int. Cl.
*B60Q 1/00*    (2006.01)
*G08G 1/00*    (2006.01)
*G06F 17/10*    (2006.01)

(52) U.S. Cl.
USPC ............. 340/435; 340/901; 701/301

(58) Field of Classification Search
USPC ............... 340/435, 901; 701/301
See application file for complete search history.

(56) References Cited

U.S. PATENT DOCUMENTS

| | | | |
|---|---|---|---|
| 2003/0149530 A1 | 8/2003 | Stopczynski | |
| 2003/0236624 A1* | 12/2003 | Kimura et al. | 701/301 |
| 2004/0090319 A1 | 5/2004 | Kimura et al. | |
| 2004/0193374 A1* | 9/2004 | Hac et al. | 701/301 |
| 2006/0011399 A1* | 1/2006 | Brockway et al. | 180/272 |
| 2006/0111841 A1* | 5/2006 | Tseng | 701/301 |
| 2007/0168128 A1* | 7/2007 | Tokoro et al. | 701/301 |
| 2009/0281704 A1* | 11/2009 | Otake | 701/96 |

FOREIGN PATENT DOCUMENTS

| | | |
|---|---|---|
| DE | 102 58 617 A1 | 4/2004 |
| JP | U-7-4211 | 1/1995 |
| JP | A-09-286313 | 11/1997 |
| JP | A-10-246323 | 9/1998 |
| JP | A-2002-166747 | 6/2002 |
| JP | A-2003-182400 | 7/2003 |
| JP | A-2004-161097 | 6/2004 |
| JP | A-2004-164189 | 6/2004 |
| JP | A-2005-031967 | 2/2005 |
| WO | WO 03/080382 A1 | 10/2003 |

* cited by examiner

*Primary Examiner* — George Bugg
*Assistant Examiner* — Jack K Wang
(74) *Attorney, Agent, or Firm* — Oliff PLC

(57) ABSTRACT

A collision probability index value corresponding to a probability of collision between a host vehicle and an obstacle is calculated based on the information indicating the relative relationship between the host vehicle and the obstacle; and the alarming braking operation is performed to cause a driver to recognize that a collision may occur by changing at least one of the drive power and the braking force when the collision probability index value reaches a predetermined threshold value. In the alarming braking operation, a target acceleration that is used as a target value in the alarming braking operation is set based on the acceleration of the host vehicle, which is detected when the collision probability index value reaches the predetermined threshold value; and at least one of the drive power and the braking force is controlled so that the target acceleration is achieved.

11 Claims, 12 Drawing Sheets

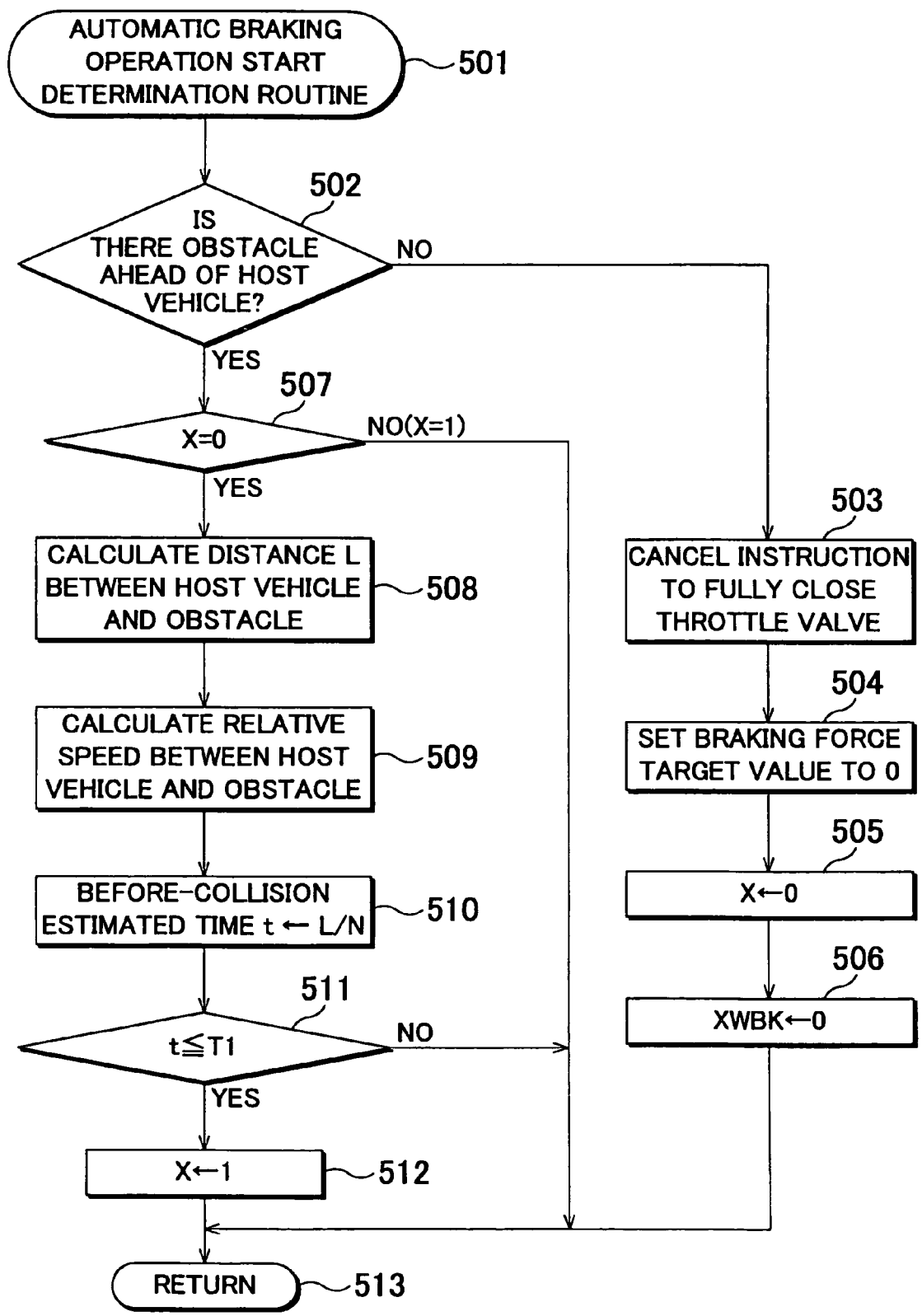

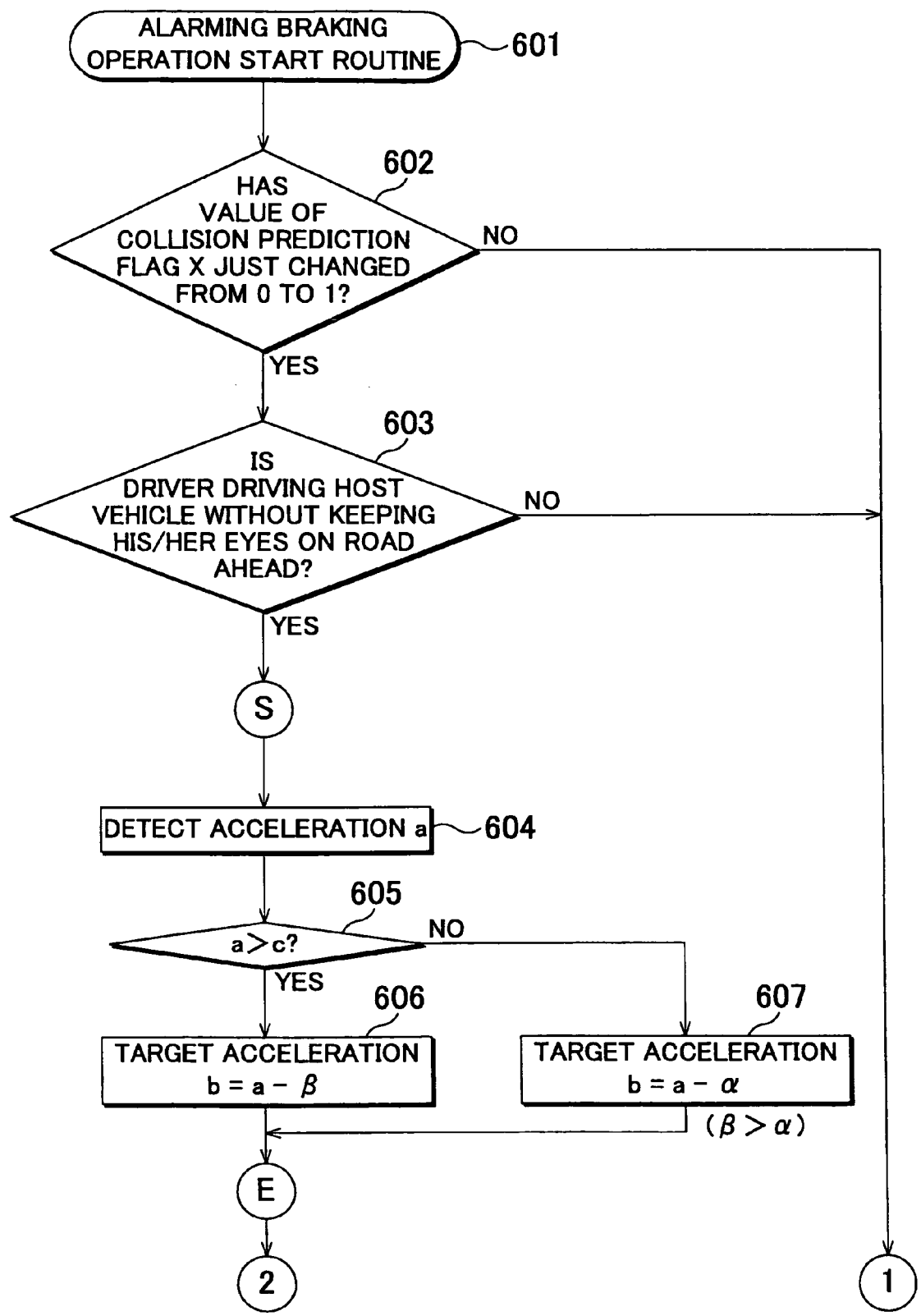

ALARM SYSTEM AND ALARM METHOD FOR VEHICLE

BACKGROUND OF THE INVENTION

1. Field of the Invention

The invention relates to an alarm system and method for a vehicle that gives an alarm to a driver by changing the acceleration of a host vehicle in order to avoid a collision between the host vehicle and an obstacle and to minimize damage that will be caused by such a collision.

2. Description of the Related Art

For example, in Japanese Patent Application Publication No. 9-286313 (JP-A-9-286313), there is an apparatus that prevents impact of a vehicle which includes obstacle detecting means for detecting an obstacle, a warning means for warning the driver by decelerating the vehicle according to the detection by the obstacle detecting means, and a vehicle speed detecting means. The apparatus warns the driver by decelerating the vehicle more when the vehicle speed detected by the speed detecting means is high. Also, for example in Japanese Patent Application Publication No. 2005-31967 (JP-A-2005-31967), there is a warning apparatus for a vehicle gives an impact to a driver by applying a braking force to a host vehicle if it is determined that there is a high probability of collision based on the relative distance and relative speed between the host vehicle and an obstacle, which are input in the host vehicle, thereby giving an alarm to the driver in order to avoid a collision between the host vehicle and the obstacle. If it is determined that there is a high probability of collision, such an apparatus for a vehicle applies a braking force to the host vehicle so that the acceleration of the host vehicle is equal to the target acceleration which is a fixed negative value.

The apparatuses for a vehicle described above apply a braking force to the host vehicle so that the acceleration of the host vehicle is equal to the target acceleration which is a fixed negative value. Accordingly, the amount of change in the acceleration vary depending on the acceleration of the host vehicle that is achieved before issuance of an alarm. As a result, various inconveniences are caused. For example, if a braking force is applied to the host vehicle so that the preset negative acceleration is achieved while the host vehicle is accelerating, the driver may feel a sense of discomfort in the operation of the host vehicle because the difference in the acceleration between before and after issuance of an alarm is excessively large. On the other hand, if a braking force is applied to the host vehicle so that the preset negative uniform acceleration is generated while the host vehicle is decelerating, only a small effect may be produced by the braking operation for giving an alarm to the driver, because the difference in the acceleration between before and after issuance of the alarm is excessively small.

SUMMARY OF THE INVENTION

The invention provides an alarm system and method for a vehicle that minimizes the inconvenience caused in the related art described above. A first aspect of the invention relates to an alarm system for a vehicle including a collision probability index value calculation unit that calculates a collision probability index value corresponding to a probability of collision between a host vehicle and an obstacle based on the information indicating the relative relationship between the host vehicle and the obstacle; and an alarming braking operation performing unit that performs the alarming braking operation to cause a driver to recognize that a collision may occur by changing at least one of the drive power for driving the host vehicle and the braking force applied to the host vehicle when the collision probability index value reaches a predetermined threshold value. More specifically, the alarming braking operation performing unit includes a target acceleration setting unit that sets a target acceleration which is used as a target value in the alarming braking operation based on the acceleration of the host vehicle, which is detected when the collision probability index value reaches the predetermined threshold value; and an acceleration control unit that controls at least one of the drive power for driving the host vehicle and the braking force applied to the host vehicle so that the target acceleration is achieved.

With the structure described above, the information indicating the relative relationship between the host vehicle and the obstacle (e.g. the distance and relative speed between the host vehicle and the obstacle) is obtained by various sensors, and the collision probability index value is calculated based on the information indicating the relative relationship between the host vehicle and the obstacle. When the collision probability index value reaches the predetermined threshold value, namely, when the probability of collision between the host vehicle and the obstacle is high, the alarming braking operation is performed to cause the driver to recognize that a collision may occur.

The target acceleration used in the alarming braking operation is set based on the acceleration of the host vehicle, which is detected when the collision probability index value reaches the predetermined threshold value (namely, immediately before the alarming braking operation is started). Then, at least one of the drive power and the braking force is controlled so that the target acceleration is achieved.

Accordingly, even if the host vehicle is accelerating immediately before the alarming braking operation is started, it is possible to prevent an amount of change in the acceleration between before and after the alarming braking operation is started from being excessively large, because the target acceleration is set to an appropriate value based on the acceleration of the host vehicle immediately before the alarming braking operation is started. It is, therefore, possible to prevent an excessively large impact from being given to the driver. In addition, even if the host vehicle is running at a constant speed or decelerating immediately before the alarming braking operation is started, it is possible to prevent an amount of change in the acceleration between before and after the alarming braking operation is started from being excessively small because the target acceleration is set to an appropriate value based on the acceleration of the host vehicle immediately before the alarming braking operation is started. As a result, the driver reliably recognizes that the alarming braking operation is performed.

The acceleration control unit may include a drive power control unit that sets the drive power to a value at which a negative acceleration is applied to the host vehicle; and a braking force control unit that sets the braking force so that the target acceleration is achieved.

With the structure described above, the drive power is set to the value at which a negative acceleration is applied to the host vehicle (for example, the engine braking state is realized) so that the target acceleration that is set based on the acceleration of the host vehicle, which is detected when the collision probability index value reaches the predetermined threshold value, is achieved. In addition, the braking force is set so that the target acceleration is achieved. When the drive power for accelerating the host vehicle is generated, it is not necessary to apply a braking force that overcomes the drive power. Accordingly, it is possible to prevent generation of an unnecessary drive power.

In this case, the drive power control unit may set the drive power for driving the host vehicle to a value at which a resistance to running of the host vehicle is generated during the alarming braking operation and after the alarming braking operation ends, and the target acceleration setting unit may set the target acceleration so that, the higher the acceleration of the host vehicle, which is detected when the collision probability index value reaches the predetermined threshold value, is, the larger the amount of change in the acceleration of the host vehicle between before and after the alarming braking operation is started is.

With the structure described above, when the collision probability index value reaches the predetermined threshold value, namely, when the probability of collision between the host vehicle and the obstacle is high, the target acceleration is set so that, the higher the acceleration of the host vehicle, which is detected when the collision probability index value reaches the predetermined threshold value, is, the larger the amount of change in the acceleration, which is caused by performing the alarming braking operation, is. During the alarming braking operation and after the alarming braking operation ends, the control is performed to set the drive power for driving the host vehicle to the value at which the resistance to running of the host vehicle is generated.

The alarming braking operation is performed when the probability of collision is high. Accordingly, even if the braking force becomes 0 after the alarming braking operation ends, the drive power may be set so that the resistance to running of the host vehicle is generated. According to the first aspect of the invention, even after the alarming braking operation ends, a predetermined negative acceleration may be achieved by maintaining the drive power at the value at which the resistance to running of the host vehicle is generated.

In such a case, if the amount of change in the acceleration of the host vehicle between before and after the alarming braking operation is started is uniform, the higher the acceleration of the host vehicle, which is detected immediately before the alarming braking operation is started, is, the larger the amount of decrease in the acceleration, which is caused by changing the drive power to the value at which the resistance to running of the host vehicle is generated, is. Accordingly, the higher the acceleration of the host vehicle, which is detected immediately before the alarming braking operation is started, is, the smaller the braking force required during the alarming braking operation is. Accordingly, the amount of change in the acceleration, which is caused when the braking force is made 0 when the alarming braking operation ends, becomes smaller, and the effect of giving an alarm to the driver using the impact generated by the difference in the acceleration between before and after the alarming braking operation also becomes smaller.

With the structure described above, the higher the acceleration of the host vehicle, which is detected when the collision probability index value reaches the predetermined threshold value, is, the larger the amount of change in the acceleration is. Accordingly, a certain degree of braking force is generated during the alarming braking operation. Accordingly, the acceleration changes by an appropriate amount between before and after the alarming braking operation ends. As a result, the driver reliably recognizes that the alarming braking operation is performed. The drive power at which the resistance to running of the host vehicle is generated is, for example, the drive power in the engine braking state. The alarming braking operation is performed for a predetermined time period (a fixed time period or a variable time period) that starts when the collision probability index value reaches the predetermined threshold value.

The target acceleration setting unit may set the target acceleration to an acceleration that is achieved at the drive power for driving the vehicle, at which the resistance to running of the host vehicle is generated.

If the acceleration of the host vehicle immediately before the alarming braking operation is started is sufficiently high, the impact given to the driver by the alarming braking operation is sufficiently large (namely, there is a sufficiently large difference between the acceleration achieved by setting the drive power for driving the vehicle to the value at which the resistance to running of the host vehicle is generated when the alarming braking operation is started and the acceleration immediately before the alarming braking operation is started). Accordingly, even if the acceleration does not change when the braking force is made 0 at the end of the alarming braking operation, a sufficient effect is produced. In such a case, if the target acceleration is set to a value lower than the acceleration achieved at the drive power for driving the vehicle, at which the resistance to running of the host vehicle is generated, an unnecessary braking force is generated for the alarming braking operation, and the driver may feel a sense of discomfort in the operation of the host vehicle. Accordingly, it is appropriate to set the target acceleration to the acceleration that is achieved at the drive power for driving the host vehicle, at which the resistance to running of the host vehicle is generated, as described above. Thus, it is possible to perform the appropriate alarming braking operation while preventing application of an unnecessary braking force.

The target acceleration setting unit may set the target acceleration to a value calculated by subtracting a predetermined value from the acceleration of the host vehicle, which is detected when the collision probability index value reaches the predetermined threshold value.

With the structure described above, when the collision probability index value reaches the predetermined threshold value, namely, when the probability of collision between the host vehicle and the obstacle is high, the target acceleration is calculated by subtracting the predetermined value (predetermined positive value) from the acceleration of the host vehicle, which is detected when the collision probability index value reaches the threshold value. Then, at least one of the drive power and the braking force is controlled to achieve the target acceleration.

Because the amount of change in the acceleration between before and after the alarming braking operation is started is uniform, the impact given to the driver is also uniform. As a result, it is possible to prevent the situation where the driver feels a sense of discomfort in the operation of the host vehicle because the amount of change in the acceleration is excessively large. It is also possible to prevent the situation where only a small effect is produced because the amount of change in the acceleration is excessively small.

In the first aspect of the invention, the collision probability index value calculation unit may calculate, as the collision probability index value, a before-collision estimated time that is a duration of time before a collision between the host vehicle and an obstacle that is present in the road on which the host vehicle will travel. The alarming braking operation performing unit may perform the alarming braking operation after determining that the collision probability index value reaches the predetermined threshold value when the calculated before-collision estimated time is equal to or shorter than a predetermined value.

With the structure described above, the before-collision estimated time, which is the duration of time before a collision between the host vehicle and the obstacle present in the road on which the host vehicle will travel, is calculated based on the information indicating the relative relationship between the host vehicle and the obstacle. When the before-collision estimated time is equal to or shorter than the predetermined value, the alarming braking operation is performed by controlling at least one of the drive power and the braking force. Accordingly, it is possible to give an alarm to the driver at an appropriate time.

The alarm system for a vehicle according to the first aspect of the invention may further include a damage minimizing braking operation unit that applies a braking force to the host vehicle after a predetermined time has elapsed since the alarming braking operation is performed.

In the first aspect of the invention, the alarming braking operation performing unit may further include an inattentive driving determination unit that determines whether the driver is driving the host vehicle without keeping his/her eyes on the road ahead. The target acceleration setting unit may set the target acceleration when it is determined that the driver is driving the host vehicle without keeping his/her eyes on the road ahead.

In the first aspect of the invention, the alarming braking operation performing unit may further include an arousal detection unit that determines whether the driver is dozing. The target acceleration setting unit may set the target acceleration when it is determined that the driver is dozing.

In the first aspect of the invention, the target acceleration setting unit may set the target acceleration only if no braking operation is performed when the collision probability index value reaches the predetermined threshold value.

A second aspect of the invention relates to an alarm system for a vehicle including collision probability index value calculation means for calculating a collision probability index value corresponding to a probability of collision between a host vehicle and an obstacle based on the information indicating the relative relationship between the host vehicle and the obstacle; and alarming braking operation performing means for performing the alarming braking operation to cause a driver to recognize that a collision may occur by changing at least one of the drive power for driving the host vehicle and the braking force applied to the host vehicle when the collision probability index value reaches a predetermined threshold value. More specifically, the alarming braking operation performing means includes target acceleration setting means for setting a target acceleration which is used as a target value in the alarming braking operation based on the acceleration of the host vehicle, which is detected when the collision probability index value reaches the predetermined threshold value; and acceleration control means for controlling at least one of the drive power for driving the host vehicle and the braking force applied to the host vehicle so that the target acceleration is achieved.

A third aspect of the invention relates to an alarm method for a vehicle. According to the third aspect of the invention, a collision probability index value corresponding to a probability of collision between a host vehicle and an obstacle is calculated based on the information indicating the relative relationship between the host vehicle and the obstacle. Then, an alarming braking operation to cause a driver to recognize that a collision may occur by changing at least one of a drive power for driving the host vehicle and a braking force applied to the host vehicle is performed when the collision probability index value reaches a predetermined threshold value Then, a target acceleration that is used as a target value in the alarming braking operation is set based on the acceleration of the host vehicle, which is detected when the collision probability index value reaches the predetermined threshold value. Then, at least one of the drive power for driving the host vehicle and the braking force applied to the host vehicle is controlled so that the target acceleration is achieved.

BRIEF DESCRIPTION OF THE DRAWINGS

The foregoing and/or further objects, features and advantages of the invention will become more apparent from the following description of an example embodiment with reference to the accompanying drawings, wherein the same or corresponding portions will be denoted by the same reference numerals and wherein:

FIG. 5 is the flowchart showing the routine executed by a CPU of an electronic control unit shown in FIG. 1;

FIGS. 6A and 6B are the flowchart showing the routine executed by the CPU of the electronic control unit shown in FIG. 1;

DETAILED DESCRIPTION OF THE EXAMPLE EMBODIMENT

In the following description, the present invention will be described in more detail in terms of an example embodiment.

Figure 1:
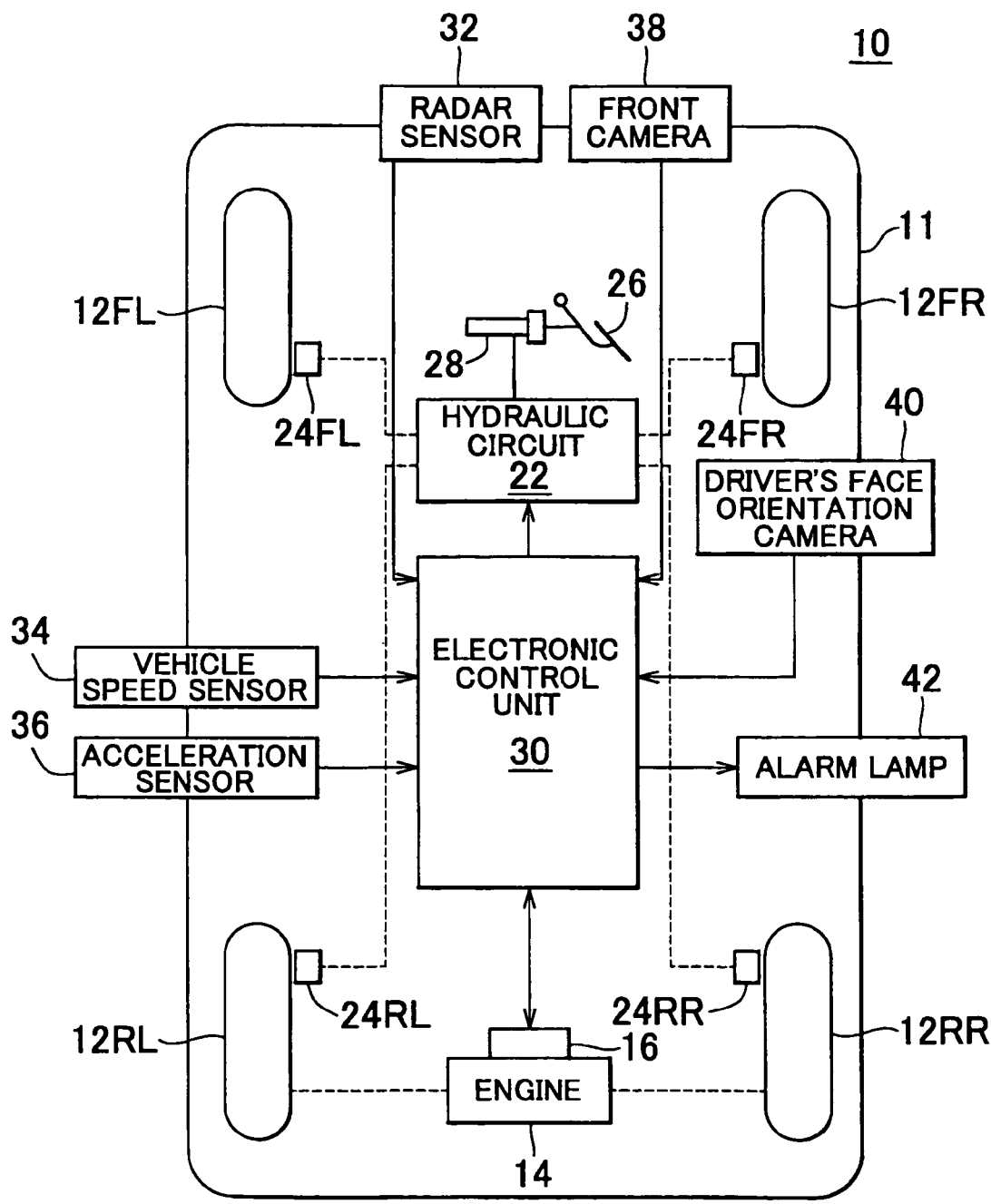
FIG. 1 is the view schematically showing an alarm system for a vehicle according to an embodiment of the invention.

Hereafter, an alarm system 10 for a vehicle according to an embodiment of the invention will be described with reference to the accompanying drawings. FIG. 1 is the view schematically showing the structure of the alarm system 10 for a vehicle.

The alarm system 10 for a vehicle (hereinafter, simply referred to as the "alarm system 10") is mounted in a host vehicle 11. The host vehicle 11 includes a right front wheel 12FR, a left front wheel 12FL, a right rear wheel 12 RR, a left rear wheel 12RL, an engine 14, a throttle valve actuator 16 that drives a throttle valve of the engine 14, a hydraulic circuit 22, a right front wheel cylinder 24FR, a left front wheel cylinder 24FL, a right rear wheel cylinder 24RR, a left rear wheel cylinder 24RL, a brake pedal 26, and a master cylinder 28.

The alarm system 10 includes an electronic control unit (hereinafter, referred to as an "ECU") 30, a radar sensor 32, a vehicle speed sensor 34, an acceleration sensor 36, a camera 38 for capturing the image of the area ahead of the host vehicle 11 (hereinafter, referred to as a "front camera 38"), a camera 40 for capturing the image of the face of a driver and detecting the orientation of the driver's face (hereinafter, referred to as a "driver's face orientation camera 40"); and an alarm lamp 42.

The right front wheel 12FR and the left front wheel 12FL, which serve as the steering wheels, are steered, via a right tie rod and a left tie rod, by a rack-and-pinion steering gear that is driven in response to the operation of a driver's steering wheel (not shown) performed by the driver.

The hydraulic circuit 22 includes an oil reservoir, an oil pump, and various electromagnetically-controlled valves. The hydraulic circuit 22 controls the braking pressure in each wheel cylinder, thereby controlling the braking force applied to each wheel. The master cylinder 28 is driven in response to the operation of the brake pedal 26 performed by the driver, and controls the braking pressure in each wheel cylinder via the hydraulic circuit 22. As described later, even when the ECU 30 changes the braking pressure, via the hydraulic circuit 22, based on the target value of the braking force, if the braking pressure instructed by the operation of the brake pedal 26 performed by the driver is higher than the target value, the braking force corresponding to the instructed braking pressure is applied to the host vehicle 11.

The ECU 30 is a micro-computer including a CPU; ROM that stores the programs executed by the CPU, the maps (look-up tables), etc. in advance; RAM in which the CPU temporarily stores the data as needed; backup RAM that stores the data when the power if on and that retains the stored data even when the power is off; an interface that includes analog/digital (AD) converter, etc. These components included in the ECU 30 are connected to each other.

The ECU 30 is connected to the radar sensor 32, the vehicle speed sensor 34, the acceleration sensor 36, the front camera 38, and the driver's face orientation camera 40. Signals from these sensors and cameras are transmitted to the CPU.

The ECU 30 is connected to the alarm lamp 42, and transmits an alarm lamp lighting signal to the alarm lamp 42 according to an instruction from the CPU. In addition, the ECU 30 is connected to the throttle valve actuator 16, and transmits a throttle valve drive signal to the throttle valve actuator 16 according to an instruction from the CPU, thereby controlling the opening amount of the throttle valve. Further, the ECU 30 is connected to the electromagnetically-controlled valves (not shown) in the hydraulic circuit 22, and transmits drive signals to these electromagnetically-controlled valves according to instructions from the CPU, thereby controlling the braking pressures in the respective wheel cylinders.

The radar sensor 32 is a millimeter-wave radar that provided at the front portion of the host vehicle 11. The radar sensor 32 detects obstacles such as other vehicles and road signs present ahead of the host vehicle 11, detects the relative distance and the relative speed between such an obstacle and the host vehicle 11, and transmits a signal indicating the detected value to the ECU 30.

The vehicle speed sensor 34 is provided at a predetermined position in the host vehicle 11. The vehicle speed sensor 34 detects the speed of the host vehicle 11, and transmits a signal indicating the detected value to the ECU 30. The acceleration sensor 36 is provided at a predetermined position in the host vehicle 11, detects the acceleration applied in the longitudinal direction of the host vehicle 11, and transmits a signal indicating the detected value to the ECU 30.

The front camera 38 includes two CCD (charge-coupled device) cameras one of which is provided at the right front portion of the host vehicle 11, and the other of which is provided at the left front portion of the host vehicle 11. The front camera 38 recognizes the obstacle detected by the millimeter-wave radar, as the image data using the parallax difference between the two cameras, thereby accurately detecting the position of the obstacle. The front camera 38 then transmits a signal indicating the detected value to the ECU 30. The driver's face orientation camera 40 is a CCD (charge-coupled device) camera that is provided at a steering column of the host vehicle 11. The driver's face orientation camera 40 captures the image of the driver's face, and transmits a signal carrying the image data to the ECU 30. The CPU of the ECU 30 detects the orientation of the driver's face by processing the received image data. The ECU 30 then determines whether the driver is driving the host vehicle 11 without keeping his/her eyes on the road ahead.

Next, the outline of the operation of the alarm system 10 according to the embodiment of the invention will be described. In the embodiment of the invention, the description will be made on the assumption that an obstacle is present at the front of the vehicle, to simplify the description.

In order to avoid a collision between the host vehicle 11 and the obstacle and minimize damage that will be caused by such a collision, the alarm system 10 performs two types of braking operations that are the braking operation for issuing an alarm (hereinafter, referred to as the "alarming braking operation") and the braking operation for minimizing damage that will be caused by a collision (hereinafter, referred to as the "damage minimizing braking operation") depending on the situation. The alarm system 10 determines whether the alarming braking operation or damage minimizing braking operation should be performed based on the estimated duration of time "t" before a collision with the obstacle (hereinafter, referred to as a "before-collision estimated time t"). The alarm system 10 calculates the before-collision estimated time "t" by dividing the relative distance L between the host vehicle 11 and the obstacle by the relative speed V between the host vehicle 11 and the obstacle. The alarming braking operation and damage minimizing braking operation are performed by the alarm system 10, for example, by decreasing the drive power produced by the engine 14, or by increasing the braking force by increasing the braking pressure in each wheel cylinder.

Figure 2:
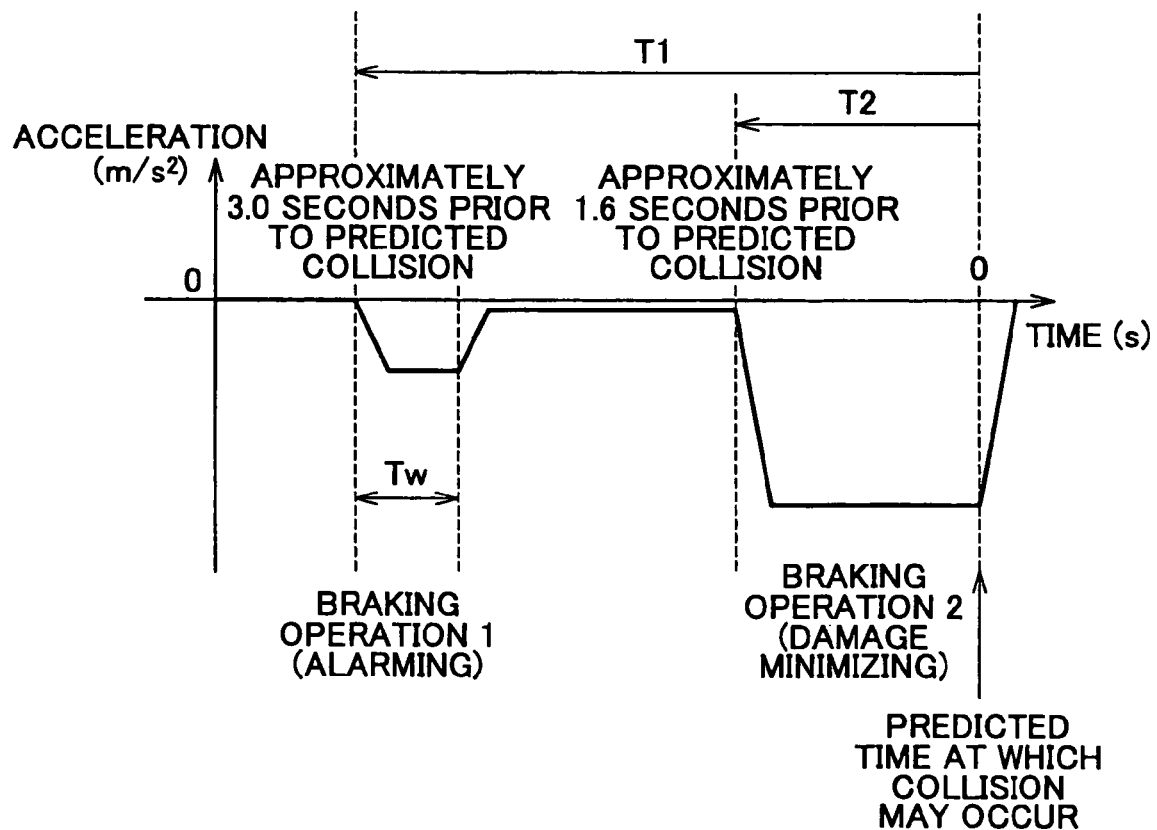
FIG. 2 is the time-chart showing times during which the alarm system for a vehicle shown in FIG. 1 performs various braking operations.

For example, as shown in FIG. 2, when the before-collision estimated time "t" is equal to the time T1, which is the time period from when the alarming braking operation should be started until when a predicted collision occurs, and the driver is driving the host vehicle 11 without keeping his/her eyes on the road ahead, the alarm system 10 performs the alarming braking operation only for the predetermined time (the alarming braking operation time Tw). When the before-collision estimated time "t" is equal to the time T2, which is the time period from when the damage minimizing braking operation should be started until when the predicted collision occurs (T2<T1), the alarm system 10 performs the damage minimizing braking operation. The amount of decrease in the acceleration, which is caused by the damage minimizing braking operation performed at this stage, may be smaller than the amount of decrease in the acceleration, which is caused by the damage minimizing braking operation performed in order to bring the host vehicle11 to an emergency stop.

Figure 3A:
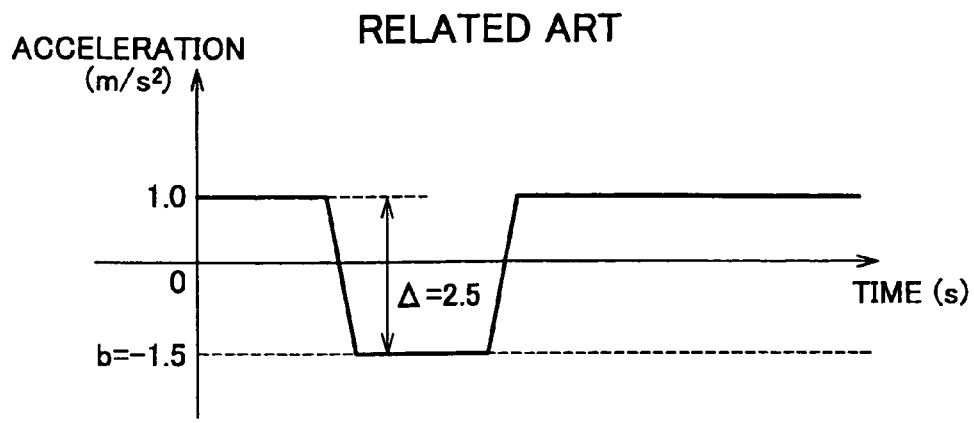
FIGS. 3A to 3C are the time-charts each showing a temporal change in the acceleration, which is caused by the alarming braking operation performed by an alarm system for a vehicle according to art related to the present invention, the acceleration immediately before the alarming braking operation is started varying among FIGS. 3A to 3C.

In order to facilitate the understanding of the operation of the alarm system 10 according to the embodiment of the invention, first, the operation of an alarm system for a vehicle according to art related to the present invention will be described with reference to FIGS. 3A to 3C. In the alarm system for a vehicle according to the related art, the target acceleration "b" used in the braking operation is a fixed negative value ("b"=−1.5 m/s² in FIGS. 3A to 3C). As shown in FIG. 3A, if a vehicle is accelerating immediately before the alarming braking operation is started (in FIG. 3A, the acceleration immediately before the alarming braking operation is started is 1.0 m/s²), the amount of change Δ in the acceleration between before and after the alarming braking operation is started is 2.5 m/s². The following description will be made on the assumption that an appropriate impact is given to a driver by performing the alarming braking operation if the amount of change A in the acceleration between before and after the alarming braking operation is started is within the range from 2.0 m/s² to 3.5 M/s².

Figure 3B:
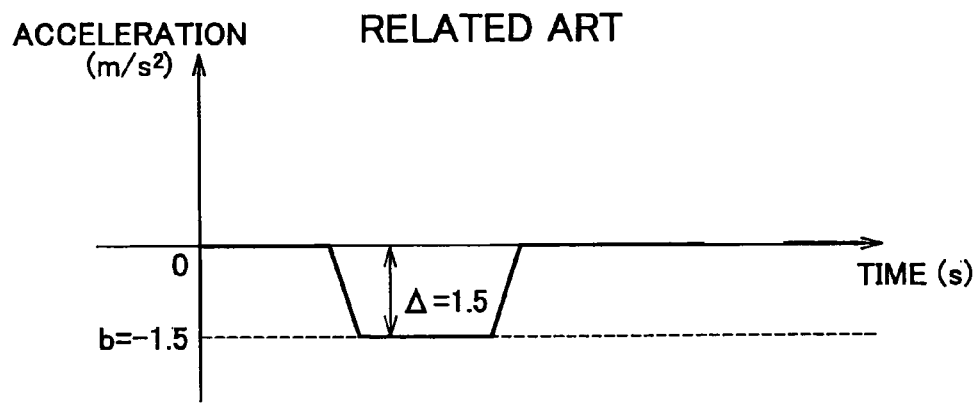
Figure 3C:
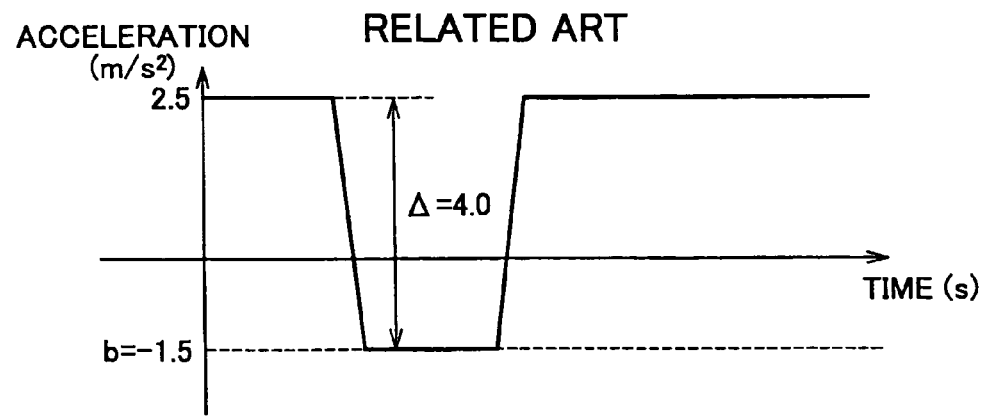

However, if the vehicle is driving at a constant speed immediately before the alarming braking operation is started, the amount of change Δ in the acceleration between before and after the alarming braking operation is started is 1.5 m/s², as shown in FIG. 3B. Accordingly, the impact given to the driver is excessively small, and, therefore, the effect of giving an alarm to the driver is also small. On the other hand, as shown in FIG. 3C, if the acceleration immediately before the alarming braking operation is started is 2.5 m/s², the amount of change Δ in the acceleration between before and after the alarming braking operation is started is 4.0 m/s². Accordingly, the impact given to the driver is excessively large, and the driver may feel a sense of discomfort in the operation of the vehicle.

Figure 4A:
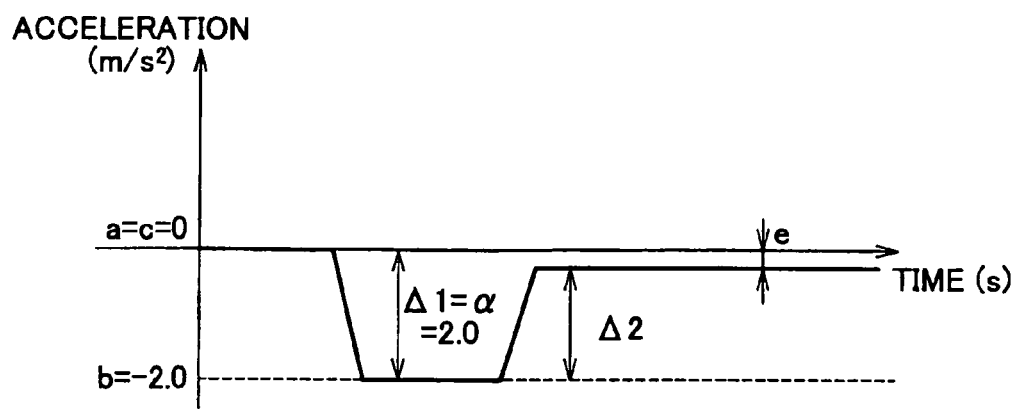
FIGS. 4A to 4C are the time-charts each showing a temporal change in the acceleration, which is caused by the alarming braking operation performed by the alarm system for a vehicle shown in FIG. 1, the acceleration immediately before the alarming braking operation is started varying among FIGS. 4A to 4C.
Figure 4B:
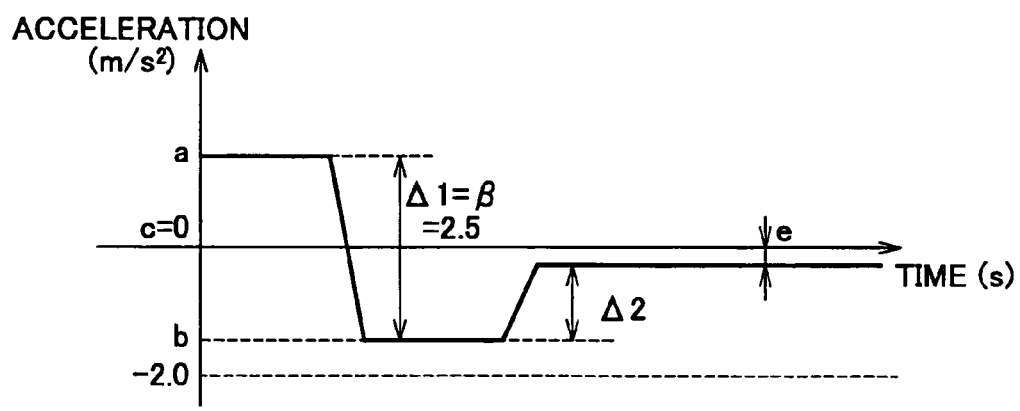

Therefore, the alarm system 10 according to the embodiment of the invention performs the alarming braking operation based on the target acceleration "b" that is set in accordance with the acceleration immediately before the alarming braking operation is started instead of a fixed negative target acceleration. More specifically, when the acceleration "a" immediately before the alarming braking operation is started is equal to or lower than the threshold value "c" (0 in FIG. 4) as shown in FIG. 4A, the alarm system 10 performs the alarming braking operation based on the target acceleration "b" which is set so that the amount of change Δ1 in the acceleration between before and after the alarming braking operation is started is 2.0 m/s² (α=2.0 m/s²). Namely, the target acceleration "b" is equal to a value obtained by subtracting the change amount a from the acceleration "a" immediately before the alarming braking operation is started (b=a−α). On the other hand, when the acceleration "a" immediately before the alarming braking operation is started is higher than the threshold value "c" as shown in FIG. 4B, the alarm system 10 performs the alarming braking operation based on the target acceleration "b" which is set so that the amount of change Δ1 in the acceleration is equal to the change amount β (β=2.5 m/s²) that is larger than the change amount α. Namely, the target acceleration "b" is equal to a value obtained by subtracting the change amount β from the acceleration "a" immediately before the alarming braking operation is started (b=a−β).

The alarm system 10 according to the embodiment of the invention maintains the throttle valve of the engine 14 fully closed (namely, the engine braking state is achieved) during and after the alarming braking operation based on the determination that performing the alarming braking operation by applying a braking force to the vehicle 11 should be avoided while the host vehicle is accelerating and the host vehicle 11 should be continuously decelerated even after the alarming braking operation ends because there still is a probability of collision. As a result, the drive power is set to a value at which running resistance is generated in the vehicle. In this case, the acceleration of the vehicle after the alarming braking operation ends is a negative value "e" (e<0). The engine braking state is the state in which the amount of fuel injected into the engine 14 is small, and, preferably, the engine braking state is the fuel supply cut-off state in which the fuel injection amount is 0. In the fuel supply cut-off state, the drive power, at which the maximum degree of resistance to the running of the host vehicle 11 is generated, is generated.

As a result, as shown in FIGS. 4A and 4B, a change, of which the amount is Δ2, is caused in the acceleration of the host vehicle 11 between before and after the alarming braking operation ends (between before and after the time point at which the braking force used to perform the alarming braking operation is returned to 0). It is also possible to give an impact to the driver with the amount of change Δ2 in the acceleration. Therefore, this impact is also used as an alarm given to the driver.

Figure 4C:
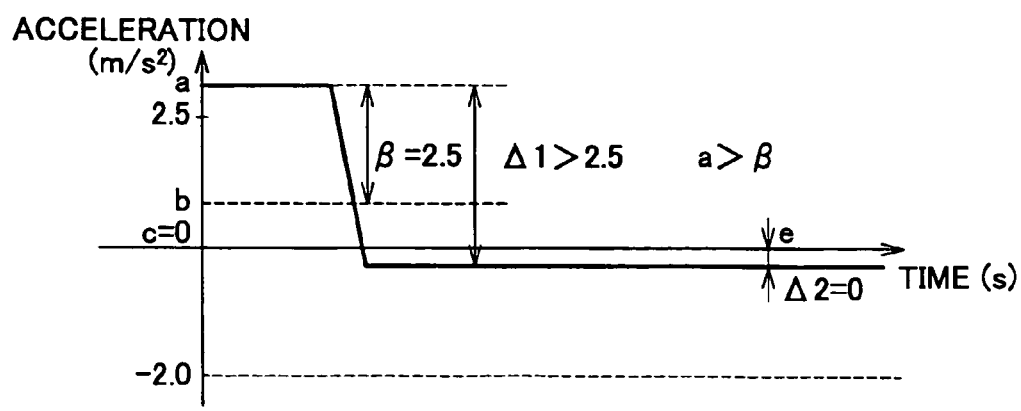

However, as shown in FIG. 4C, if the acceleration "a" immediately before the alarming braking operation is started is excessively high, the target acceleration "b" that is calculated by subtracting the amount of change β (β=2.5 m/s²) in the acceleration from the acceleration "a" immediately before the alarming braking operation is started may be higher than the acceleration "e". In this case, the alarm system 10 sets the drive power to the value at which running resistance is generated in the vehicle and sets the braking force to 0 regardless of the target acceleration "b". In this case, the amount of change Δ2 in the acceleration between before and after the alarming braking operation ends is 0. Therefore, it is no longer possible to give an alarm to the driver using an impact caused by a change in the acceleration between before and after the alarming braking operation ends. However, because the amount of change Δ1 in the acceleration between before and after the alarming braking operation is started is larger than that in each of FIGS. 4A and 4B, the total impact given to the driver by the alarming braking operation (namely, the total effect of the alarming braking operation) is made substantially equal to that in the case shown in each of FIGS. 4A and 4B.

According to the embodiment of the invention described above, it is possible to perform the alarming braking operation in which substantially the same degree of impact is given to the driver regardless of the acceleration "a" immediately before the alarming braking operation is started. Accordingly, it is possible to prevent the driver from feeling a sense of discomfort in the operation of the host vehicle 11 due to an alarm, and to prevent the effect of the braking operation from being excessively small.

The actual operations of the alarm system 10 configured in the above-described manner will be described below. In the following description, the operations performed in five cases will be described.

(A) Hereafter, the operation performed when there is no obstacle ahead of the host vehicle 11 or an obstacle is no longer present ahead of the vehicle will be described. In this case, the ECU 30 executes, at predetermined intervals, the routine (the automatic braking operation start determination routine), shown in the flowchart in FIG. 5, to determine whether the braking operation for avoiding a collision between the host vehicle 11 and an obstacle or the braking operation for minimizing damage that will be caused by such a collision should be started.

The ECU 30 starts step 501 in the automatic braking operation start determination routine at a predetermined time. Then, the ECU 30 executes step 502. In step 502, the ECU 30 determines whether there is an obstacle ahead of the host vehicle 11 based on a signal transmitted from the radar sensor 32.

In this case, because there is no obstacle ahead of the host vehicle 11, the ECU 30 makes a negative determination in step 502, and executes step 503. In step 503, the ECU 30 cancels the throttle valve fully-closing instruction for fully closing the throttle valve. The throttle valve fully-closing instruction is issued when the alarming braking operation is performed, as described later. Next, the ECU 30 executes step 504. In step 504, the ECU 30 sets the braking force target value to 0. When the braking force target value is 0, a braking force is not applied to the host vehicle 11 unless the driver operates the brake pedal 26.

In step 505, the ECU 30 sets the value of a collision prediction flag X to 0. If the value of the collision prediction flag X is 0, the probability of collision is low and neither the alarming braking operation nor the operation that is performed subsequent to the alarming braking operation to minimize damage of a collision (the damage minimizing braking operation) need to be performed. On the other hand, if the value of the collision prediction flag X is 1, there is a high probability of collision, and the alarming braking operation and/or the damage minimizing braking operation needs to be performed. As described later, the value of the collision prediction flag X is set to 1, when the before-collision estimated time "t" is equal to or shorter than the time T1.

Then, the ECU 30 executes step 506. In step 506, the ECU 30 sets the value of the alarming braking operation braking force generation flag (hereinafter, referred to as the "braking force generation flag") XWBK to 0. If the value of the braking force generation flag XWBK is 0, a braking force used for the alarming braking operation has not been generated (a braking force used for the alarming braking operation is 0). If the value of the braking force generation flag XWBK is 1, the braking force used for the alarming braking operation has been generated (the braking force is a positive value). Then, the process proceeds to step 513, after which the routine ends.

(B) Hereafter, the operation performed when the before-collision estimated time is shorter than the time T1 although there is an obstacle ahead of the vehicle will be described. In this case as well, the ECU 30 starts step 501 in the automatic braking operation start determination routine at a predetermined time. Then, the ECU 30 executes step 502. In step 502, the ECU 30 determines whether there is an obstacle ahead of the vehicle. In this case, because there is an obstacle ahead of the vehicle, the ECU 30 makes an affirmative determination, and executes step 507.

In step 507, the ECU 30 determines whether the value of the collision prediction flag X is 0. In this case, the value of the collision prediction flag X is set to 0 in step 505. Accordingly, the ECU 30 makes an affirmative determination in step 507, and executes step 508.

In step 508, the ECU 30 calculates the distance L between the host vehicle 11 and the obstacle ahead of the host vehicle 11 based on the signals from the radar sensor 32 and the front camera 38. Next, the ECU 30 executes step 509. In step 509, the ECU 30 calculates the relative speed V between the host vehicle 11 and the obstacle ahead of the host vehicle 11 based on the signal from the radar sensor 32.

Next, the ECU 30 executes step 510. In step 510, the ECU 30 calculates the estimate duration of time "t" before a collision between the host vehicle 11 and the obstacle ahead of the host vehicle 11 (the before-collision estimated time "t") by dividing the distance L between the host vehicle 11 and the obstacle ahead of the host vehicle 11 by the relative speed V between the host vehicle 11 and the obstacle ahead of the host vehicle 11. Next, the ECU 30 executes step 511. In step 511, the ECU 30 determines whether the before-collision estimated time "t" is equal to or shorter than the time T1. The before-collision estimated time "t" is a collision probability index value calculated based on the probability of collision between the host vehicle 11 and the obstacle. Therefore, the ECU 30 determines whether the collision probability index value has reached the threshold value at which the alarming braking operation should be started.

Because the before-collision estimated time "t" has not been reached the T1, the before-collision estimated time "t" is longer than the time T1. Accordingly, the ECU 30 makes a negative determination in step 511, and the process proceeds to 513 without execution of step 512, after which the automatic braking operation start determination routine ends.

(C) Hereafter, the operation performed when the before-collision estimated time "t" becomes equal to the time T1 will be described. In this case, the ECU 30 starts step 501 in the automatic braking operation start determination routine at a predetermined time. The ECU 30 then executes step 502, steps 507 to 510, makes an affirmative determination in step 511, and executes step 512. In step 512, the value of the collision predication flag X is set to 1. In other words, the ECU 30 outputs, in step 512, an instruction to start the automatic braking operation. Next, the process proceeds to step 513, after which the automatic braking operation start determination routine ends.

Figure 6B:
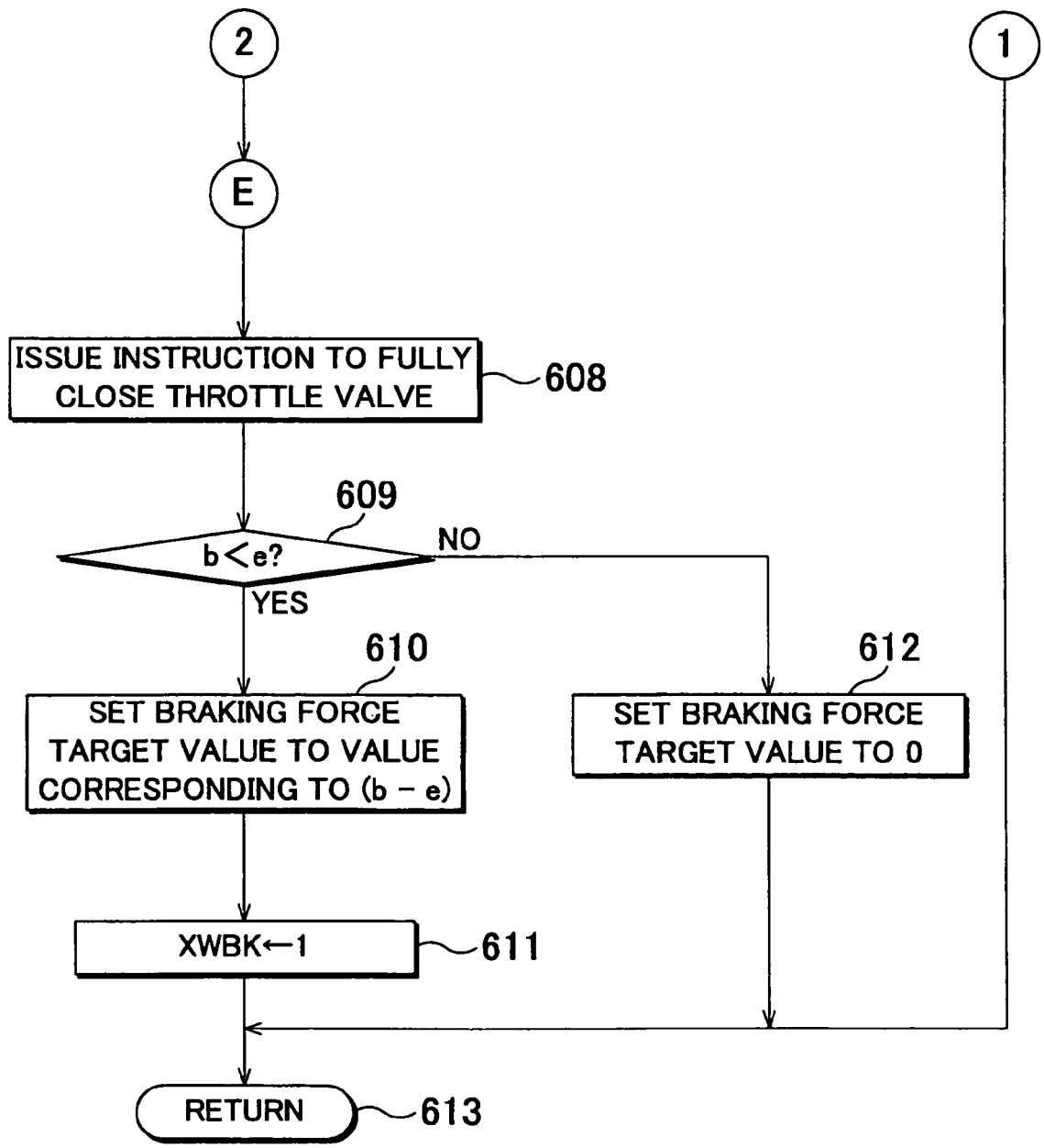

The ECU 30 executes, at predetermined intervals, the routine for starting the braking operation (the alarming braking operation start routine), shown in the flowchart in FIGS. 6A and 6B, to notify the driver that a collision may occur in order to avoid a collision between the host vehicle 11 and the obstacle and to minimize damage that will be caused by the predicted collision.

The ECU 30 starts step 601 in the alarming braking operation start routine from step 601 at a predetermined time, and executes step 602. In step 602, the ECU 30 determines whether the value of the collision prediction flag X has just changed from 0 to 1. If step 512 in FIG. 5 has been just completed, the value of the collision prediction flag X has just changed from 0 to 1. Accordingly, the ECU 30 makes an affirmative determination in step 602, and executes step 603.

In step 603, the ECU 30 determines whether the driver is driving the host vehicle 11 without keeping his/her eyes on the road ahead. The alarming braking operation is performed if it is determined that the driver is driving the host vehicle 11 without keeping his/her eyes on the road ahead. More specifically, in step 603, the ECU 30 detects the orientation of the driver's face by processing the image data captured by the driver's face orientation camera 40, and determines that the driver is driving the host vehicle 11 without keeping his/her eyes on the road ahead if the driver's face is not oriented toward the road ahead. If it is not determined that the driver is driving the host vehicle 11 without keeping his/her eyes on the road ahead, it is not necessary to perform the alarming braking operation. Accordingly, the ECU 30 makes a negative determination, and the process proceeds to step 613 without execution of steps 602 to 612, after which the alarming braking operation start routine ends.

On the other hand, if the ECU 30 determines that the driver is driving the host vehicle 11 without keeping his/her eyes on the road ahead, the ECU 30 makes an affirmative determination in step 603, and executes step 604. In step 604, the ECU 30 detects the acceleration "a" of the host vehicle 11 based on the signal from the acceleration sensor 36. Next, the ECU 30 executes step 605. In step 607, the ECU 30 determines whether the acceleration "a" is higher than the acceleration threshold value "c" (although the acceleration threshold value "c" is 0 in the embodiment of the invention, the acceleration threshold value "c" may be any predetermined positive value).

If it is determined that the acceleration "a" is higher than the acceleration threshold value "c", the ECU 30 makes an affirmative determination in step 605, and executes step 606. In step 606, the ECU 30 calculates the target acceleration "b" used in the alarming braking operation according to the following equation 1). Then, the ECU 30 executes step 608. On the other hand, if it is determined that the acceleration "a" is equal to or lower than the acceleration threshold value "c", the ECU 30 makes a negative determination in step 605, and executes step 607. In step 607, the ECU 30 calculates the target acceleration "b" according to the following equation 2).

$$b=a-\beta \quad \text{Equation 1)}$$

$$b=a-\alpha \quad \text{Equation 2)}$$

Each of the change amounts α and β is a positive value, and the change amount β is larger than the change amount α. Each of the change amounts α and β is set to a value (for example, a value in the range from 2.0 m/s² to 3.5 m/s²) at which an excessively large impact is not given to the driver but a sufficient effect is produced. Thus, the target acceleration "b" used in the alarm braking operation is set in accordance with the acceleration "a" of the host vehicle 11 immediately before the alarming braking operation is started (the acceleration "a" of the host vehicle 11 when the before-collision estimated time "t" is equal to the time T1, namely, when the collision probability index value reaches the predetermined threshold value). More specifically, the target acceleration "b" is set so that, the higher the acceleration "a" of the host vehicle 11 when the collision probability index value reaches the threshold value is, the larger the amount of change in the acceleration of the host vehicle 11 between before and after the alarming braking operation is started is.

Figure 9:
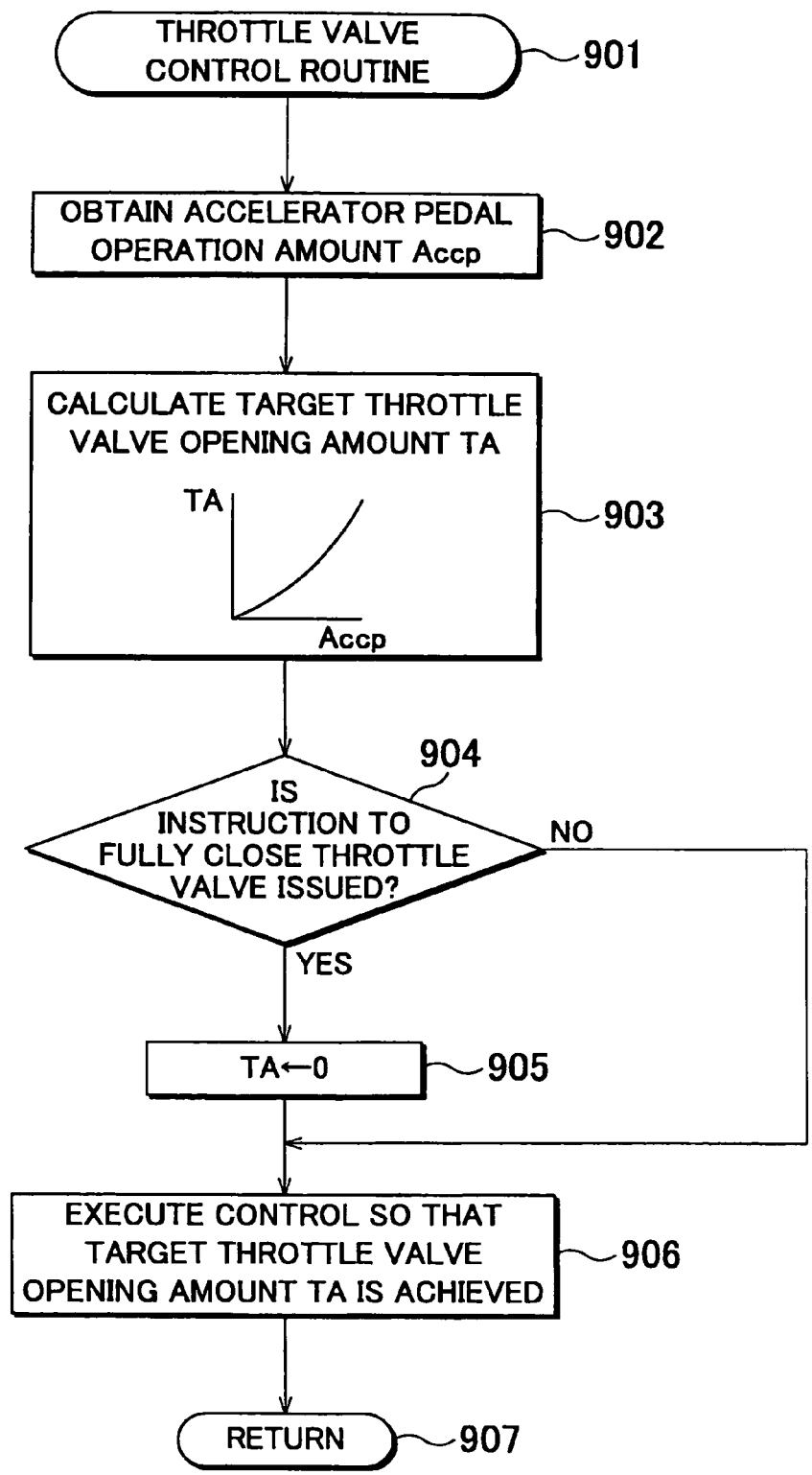
FIG. 9 is the flowchart showing the routine executed by the CPU of the electronic control unit shown in FIG. 1.

Next, the ECU 30 executes step 608, and outputs an instruction to fully close the throttle valve. At this time, the ECU 30 controls the opening amount of the throttle valve by executing the throttle valve control routine shown in the flowchart in FIG. 9, described later. Accordingly, the opening amount of the throttle valve is controlled so that the throttle valve is fully closed.

Next, the ECU 30 executes step 609. In step 609, the ECU 30 determines whether the target acceleration "b" is lower than the acceleration "e" when the throttle valve is fully closed (hereinafter, referred to as the throttle valve fully-closed time acceleration "e") (e<0). The throttle valve fully-closed time acceleration "e" is the acceleration applied to the host vehicle 11 when throttle valve is kept fully closed. The throttle valve fully-closed time acceleration "e" may be a fixed value, or may be variable in accordance with the current vehicle speed, shift position, road gradient, etc. If the target acceleration "b" is lower than the throttle valve fully-closed time acceleration "e", the ECU 30 makes an affirmative determination in step 609, and executes step 610. In step 610, the ECU 30 sets the braking force target value to the value corresponding to the value obtained by subtracting the throttle valve fully-closed time acceleration "e" from the target acceleration "b" (b−e) (the braking force required to decelerate the host vehicle 11 by the amount of acceleration |b−e|. Thus, drive signals are transmitted to the electromagnetically-controlled valves in the hydraulic circuit 22 (so that a braking force corresponding to the braking force target value is generated according to the braking force control routine (not shown)), and a braking force is generated by controlling the braking pressure in each wheel cylinder. As a result, the acceleration of the host vehicle 11 is equal to the target acceleration "b". The lower the acceleration "a" before the alarming braking operation is performed is, the lower the target acceleration "b" is. Accordingly, the lower the acceleration "a" before the alarming braking operation is started is, the larger the braking force target value is, and, therefore, the larger the braking force applied to the host vehicle 11 is.

Next, the ECU 30 executes step 611. In step 611, the ECU 30 sets the value of the braking force generation flag XWBK to 1 to indicate that the braking force is applied to the host vehicle 11 to perform the alarming braking operation, and the process proceeds to step 613, after which the routine ends. Thus, the acceleration of the host vehicle 11 is changed from the acceleration "a" to the target acceleration "b". In other words, when the acceleration "a" of the host vehicle 11 is higher than the threshold value "c", the acceleration is changed to the acceleration calculated by subtracting the change amount β from the acceleration "a". When the acceleration "a" is equal to or lower than the threshold value "c", the acceleration is changed to the acceleration calculated by subtracting the change amount α from the acceleration "a".

When the target acceleration "b" is equal to or higher than the throttle valve fully-closed time acceleration "e", the ECU 30 makes a negative determination in step 609, and sets the braking force target value to 0 in step 612, and then process proceeds to step 613, after which the alarming braking operation start routine ends. Accordingly, the alarming braking operation is performed using only the engine braking. Thus, the target acceleration "b" is set, the throttle valve is fully closed, and the braking force is applied to the host vehicle 11, whereby the alarming braking operation is started.

Figure 7:
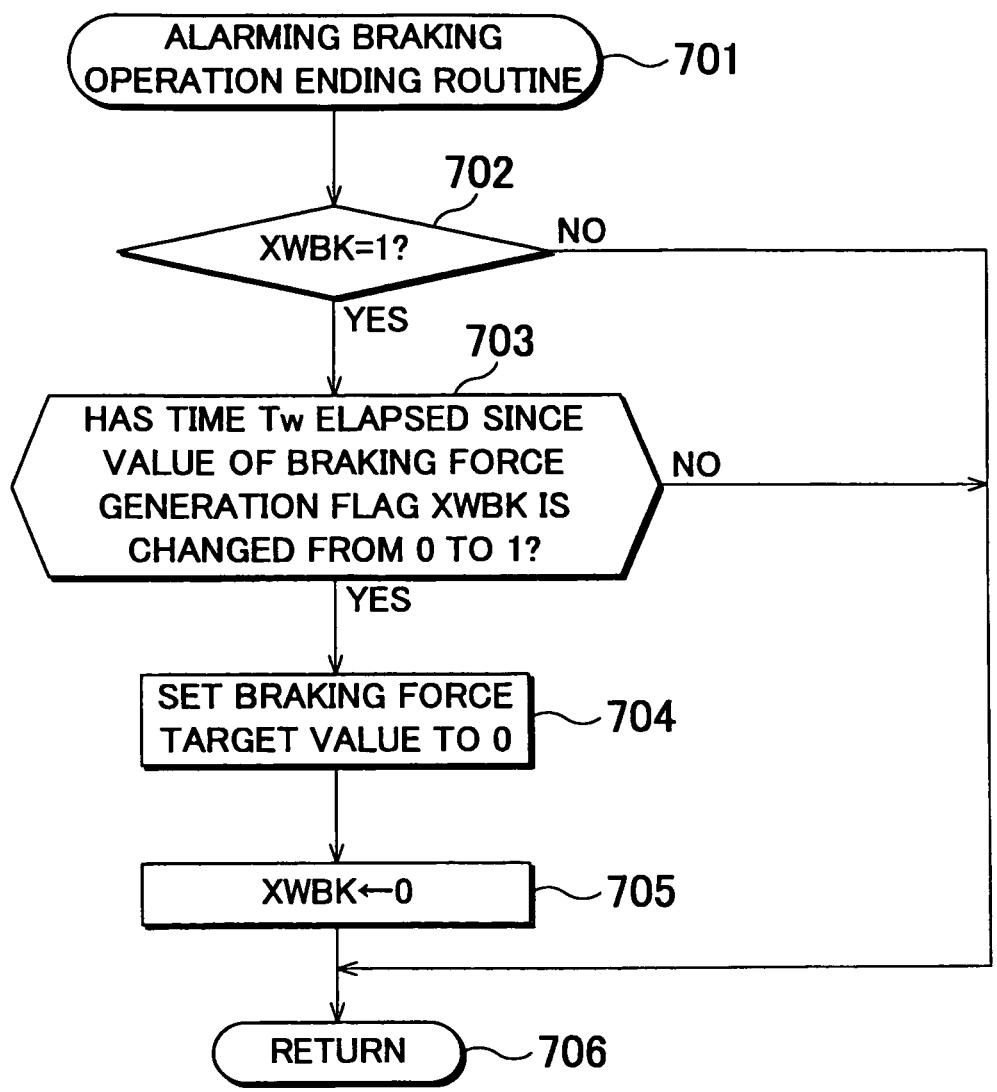
FIG. 7 is the flowchart showing the routine executed by the CPU of the electronic control unit shown in FIG. 1.

When the ECU 30 makes an affirmative determination in step 609 and the braking force is applied to the host vehicle 11 by executing step 610, the alarming braking operation is terminated by canceling the application of the braking force. Therefore, the ECU 30 executes the alarming braking operation ending routine shown in the flowchart in FIG. 7 at predetermined intervals.

The ECU 30 starts step 701 in the alarming braking operation ending routine at a predetermined time, and executes step 702. In step 702, the ECU 30 determines whether the value of the braking force generation flag XWBK is 1. The following description will be made on the assumption that the predetermined alarming braking operation time Tw has not elapsed since the braking force target value is set to a value that is not 0 (a value corresponding to (b−e)) to perform the alarming braking operation (to achieve the target acceleration "b"). In this case, the value of the braking force generation flag XWBK is set to 1 in step 611 in the alarming braking operation start routine in FIG. 6B. Accordingly, the ECU 30 makes an affirmative determination in step 702, and executes step 703.

In step 703, the ECU 30 determines whether the predetermined alarming braking operation time Tw has elapsed since the value of the braking force generation flag XWBK is changed from 0 to 1. In this case, because the alarming braking operation time Tw has not elapsed since application of the braking force is started, the ECU 30 makes a negative determination in step 703, and the process proceeds to step 706, after which the alarming braking operation ending routine ends.

When the alarming barking operation time Tw has elapsed since the application of the braking force is started, the ECU 30 makes an affirmative determination in step 703, and executes step 704. In step 704, the ECU sets the braking force target value to 0 to cancel application of the braking force, sets the value of the braking force generation flag XWBK to 0 in step 705, and the process proceeds to step 706, after which the alarming braking operation ending routine ends. At this time, the alarming braking operation ends. Thus, the state of the host vehicle 11 is changed from the state where the braking force used for the alarming braking operation and the negative drive power generated by engine braking are applied to the host vehicle 11 to the state where only the negative drive power generated by engine braking is applied to the host vehicle 11. Thus, an impact is given to the driver by accelerating the host vehicle 11 by the amount corresponding to (e−b), the driver recognizes the alarm again.

After the alarming braking operation is started, if the driver recognizes that a collision may occur and performs the operation to avoid the collision, for example, the steering operation and/or the braking operation, or if the preceding vehicle, which is regarded as an obstacle, changes its path, the obstacle may no longer be present ahead of the host vehicle 11. In this case, the alarm system 10 need not perform the damage minimizing braking operation. On the other hand, if the state does not change, for example, if the driver does not perform the operation to avoid a collision or the preceding vehicle does not change its path, the alarm system 10 performs the damage minimizing braking operation.

Figure 8:
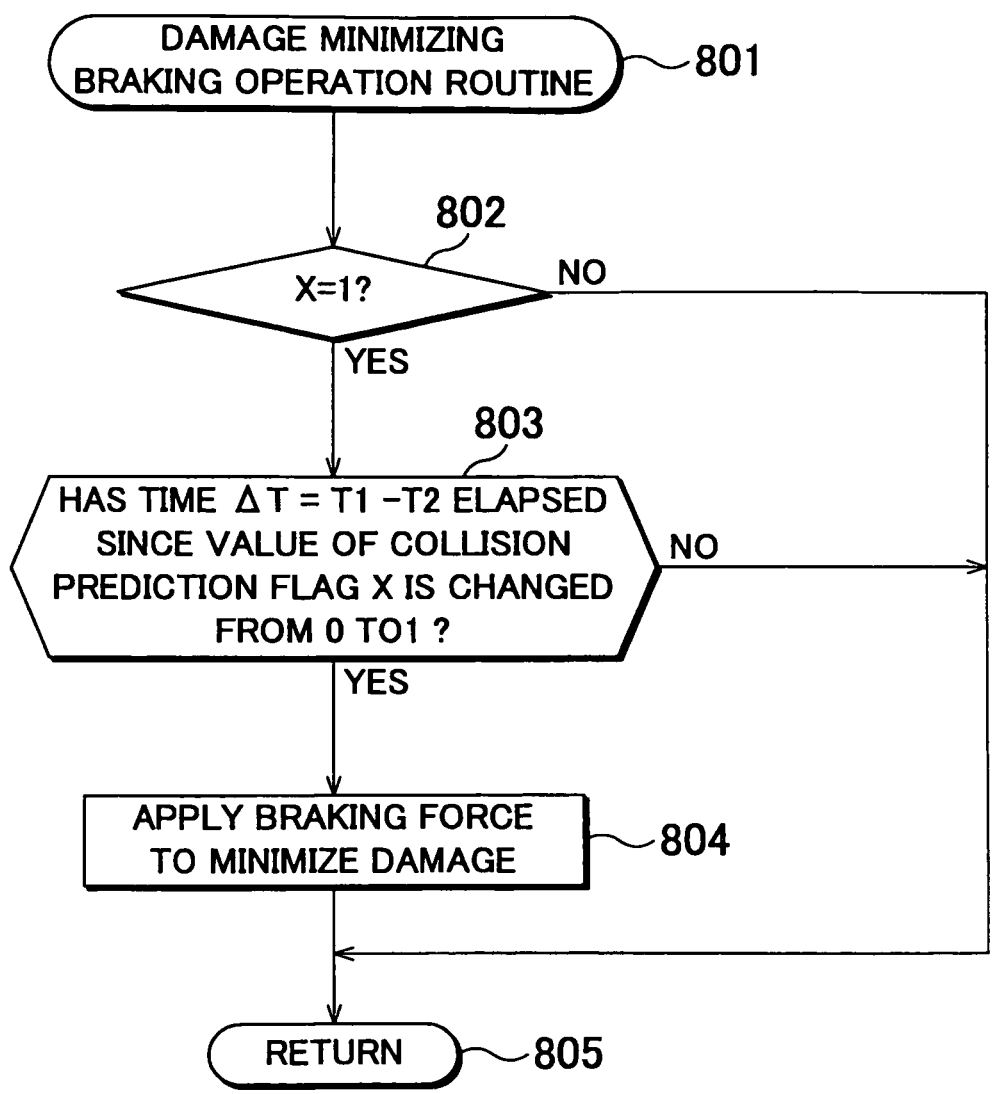
FIG. 8 is the flowchart showing the routine executed by the CPU of the electronic control unit shown in FIG. 1.

In order to perform the damage minimizing braking operation, the ECU 30 executes the damage minimizing braking operation routine shown in the flowchart in FIG. 8 at predetermined intervals. The following description will be made on the assumption that the obstacle is continuously present ahead of the host vehicle 11 even after the alarming braking operation is performed and the time at which the damage minimizing braking operation should be performed has not been reached.

The ECU 30 start step 801 in the damage minimizing braking operation routine at a predetermined time, and executes step 802. In step 802, the ECU 30 determines whether the value of the collision prediction flag X is 1. The value of the collision prediction flag X is set to 0 by executing steps 502 and 505 in FIG. 5, when it is determined that the obstacle is no longer present ahead of the host vehicle 11 as a result of the operation to avoid a collision, etc. On the other hand, if the obstacle is continuously present ahead of the host vehicle 11, step 505 is not executed. Accordingly, the value of the collision prediction flag X is maintained at 1. In this case, because the value of the collision prediction flag X is maintained at 1, the ECU 30 makes an affirmative determination in step 802, and executes step 803.

In step 803, the ECU 30 determines whether the time ΔT, which is calculated by subtracting the time T2 from the time T1, has elapsed since the value of the collision prediction flag X is changed from 0 to 1. In other words, the ECU 30 determines whether the before-collision estimated time "t" is equal to the time T2. In this case, the before-collision estimated time "t" is longer than the time T2, namely, the time ΔT has not elapsed since the value of the collision prediction flag X is changed from 0 to 1. Accordingly, the ECU 30 makes a negative determination in step 803, and the process proceeds to step 805, after which damage minimizing braking operation routine ends.

When the before-collision estimated time "t" is equal to the time T2, the ECU makes an affirmative determination in step 803 subsequent to step 802, and executes step 804. In step 804, the ECU 30 applies a braking force for minimizing damage to the host vehicle 11, and the process proceeds to step 805, after which damage minimizing braking operation routine ends. The braking force for minimizing damage is set, for example, according to a known method so that the maximum deceleration is achieved.

On the other hand, if the obstacle is no longer present ahead of the host vehicle 11 as a result of the operation to avoid a collision, etc. after the alarming braking operation is started, the value of the collision prediction flag X is set to 0 by executing steps 502 and 505 in FIG. 5. Accordingly, when the ECU 30 starts step 801 in the routine in FIG. 8 and then executes step 802, the ECU 30 makes a negative determination in step 802, and executes step 805 without executing steps 803 and 804. As a result, the damage minimizing braking operation is not performed.

(D) Hereafter, the operation performed when there is an obstacle ahead of the host vehicle 11 and an instruction to start the automatic braking operation has been issued will be described. In this case as well, the ECU 30 starts step 501 in the automatic braking operation start determination routine at a predetermined time. The ECU 30 makes an affirmative determination in step 502, and executes step 507. In step 507, the ECU 30 determines whether an instruction to start the automatic braking operation has been issued. Because an instruction to start the automatic braking operation has been issued, the ECU 30 makes a negative determination in step 507, and the process proceeds to step 513 without execution of steps 508 to 512, after which the automatic braking operation start determination routine ends.

The ECU 30 starts step 601 in the alarming braking operation start routine at a predetermined time, and executes step 602. In step 602, the ECU 30 determines whether the value of the collision prediction flag X has just changed from 0 to 1. In this case, because an instruction to start the automatic braking operation has been issued, it is not determined that the flag X has just changed from 0 to 1. Accordingly, the ECU 30 makes a negative determination in step 602, and the process proceeds to step 613, after which the alarming braking operation start routine ends.

(E) Hereafter, the operations performed in other cases will be described. When the value of the braking force generation flag XWBK is 0, a braking force used for the alarming braking operation is not applied to the host vehicle 11. Accordingly, there is no need to cancel application of a braking force used for the alarming braking operation. Therefore, the ECU 30 makes a negative determination in step 702 in the alarming braking operation ending routine shown in FIG. 7, and the process proceeds to step 706, after which the alarming braking operation ending routine ends.

The throttle valve control routine will be described below. The ECU 30 executes the routine (the throttle valve control routine) shown in the flowchart in FIG. 9 at predetermined intervals. According to the routine shown in the flowchart in FIG. 9, the drive power for driving the host vehicle 11 is controlled by controlling the throttle valve of the engine. As the opening amount of the throttle valve increases, the drive power for driving the host vehicle 11 also increases.

More specifically, the ECU 30 starts step 901 in the throttle valve control routine at a predetermined time, and executes step 902. In step 902, the ECU 30 receives a signal indicating the accelerator pedal operation amount Accp achieved by the driver, from an accelerator pedal operation amount sensor (not shown). Next, the ECU 30 executes step 903. In step 903, the ECU 30 calculates the target throttle valve opening amount TA based on the accelerator pedal operation amount Accp received in step 902 according to the map indicating the relationship between the accelerator pedal operation amount and the target throttle valve opening amount shown in the box of step 903 in FIG. 9.

Next, the ECU 30 executes step 904. In step 904, the ECU 30 determines whether an instruction to fully close the throttle valve has been issued. If it is determined that an instruction to fully close the throttle valve has been issued, the ECU 30 makes an affirmative determination in step 904, and executes step 905. The ECU 30 sets the target throttle valve opening amount TA to 0 in step 905, and executes step 906. If it is determined that an instruction to fully close the throttle valve has not been issued, the ECU 30 makes a negative determination in step 904, and executes step 906 without executing step 905. In step 906, the ECU 30 transmits a drive signal to the throttle valve actuator 16 so that the opening amount of the throttle valve is equal to the target throttle valve opening amount TA, and the process proceeds to step 907, after which the routine ends. The target throttle valve opening amount TA is usually used as the function of the accelerator pedal operation amount Accp. When an instruction to fully close the throttle valve is issued, the throttle valve actuator 16 is controlled so that the target throttle valve opening amount TA is 0.

As described so far, the alarm system 10 according to the embodiment of the invention sets the target acceleration "b" used in the alarming braking operation based on the acceleration of the host vehicle 11, which is detected when the before-collision estimated time "t" is equal to the time T1. Then, the drive power is made 0 by fully closing the throttle valve. Namely, the drive power is set to a value at which a negative acceleration is applied to the host vehicle 11 (the drive power at which the resistance to the forward running of the host vehicle 11 is generated). In addition, if it is determined that the target acceleration "b" is not achieved, a braking force is applied to the host vehicle 11. As a result, even if the host vehicle 11 is accelerating immediately before the alarming braking operation is started, the target acceleration "b" is set to an appropriate value based on the acceleration immediately before the alarming braking operation is started. Accordingly, it is possible to prevent an amount of change in the acceleration between before and after the alarming braking operation is started from being excessively large, and, therefore, it is possible to prevent an excessively large impact from being given to the driver. In addition, even if the host vehicle 11 is running at a constant speed or decelerating immediately before the alarming braking operation is started, the target acceleration "b" is set to an appropriate value based on the acceleration immediately before the alarming braking operation is started. Accordingly, it is possible to prevent a change in the acceleration between before and after the alarming braking operation is started from being excessively small. As a result, the driver reliably recognizes that the alarming braking operation is performed.

The invention is not limited to the embodiment described above. The invention may be realized in various modified examples described below.

For example, the ECU 30 of the alarm system 10 according to the embodiment of the invention determines whether the acceleration "a" is higher than the acceleration threshold value "c" in step 605 in the alarming braking operation start routine shown in FIG. 6A. The ECU 30 then calculates the target acceleration "b" by one of the two methods depending on the determination results. Alternatively, it may be determined whether the acceleration "a" is higher than each of the two threshold values, and the target acceleration may be calculated by one of the three methods depending on the determination results.

Figure 10:
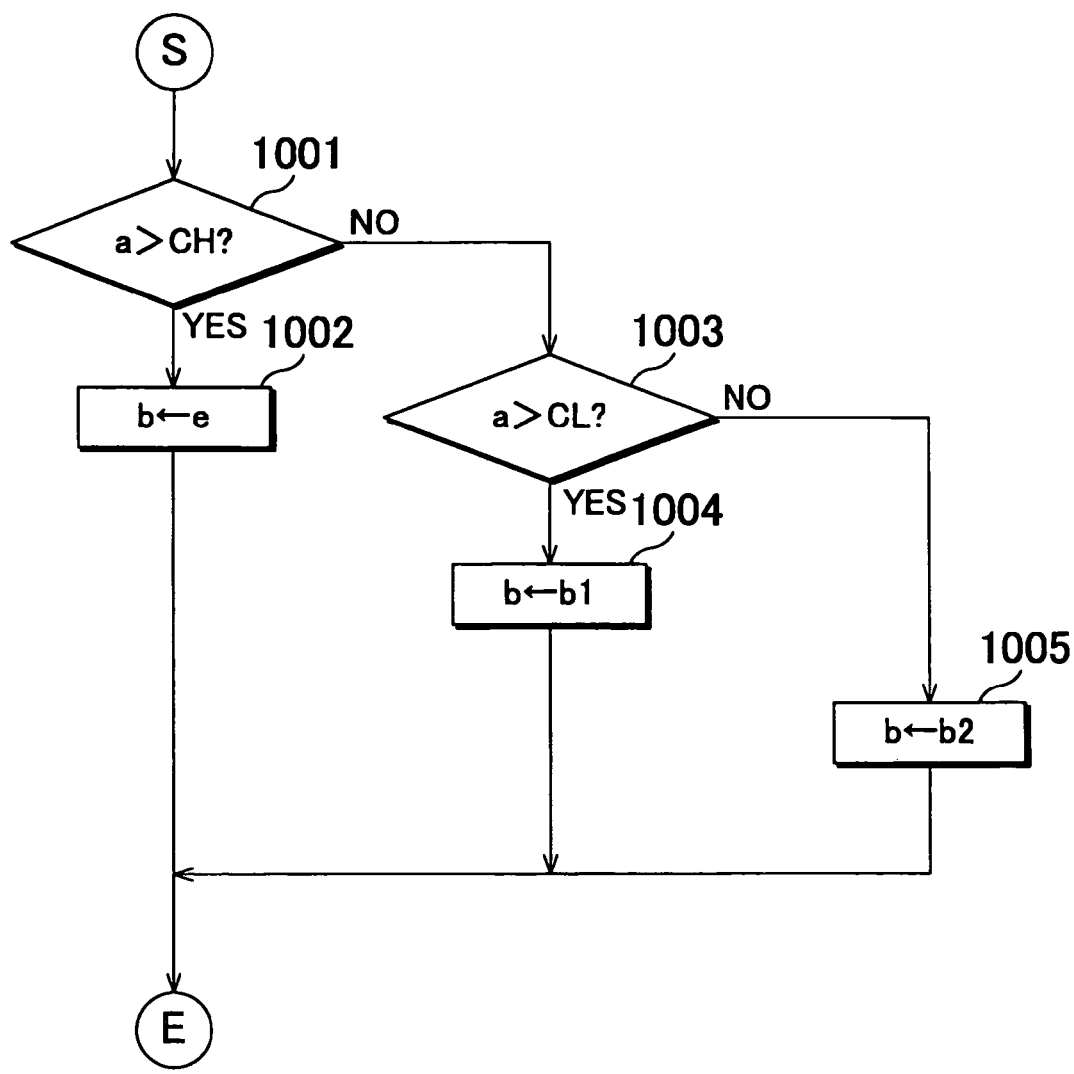
FIG. 10 is the flowchart showing the routine executed by the CPU of the alarm system according to a modified example of the embodiment of the invention.

More specifically, the program may be changed so that, if the ECU 30 makes an affirmative determination in step 603 in FIG. 6A, the process proceeds to step S in the flowchart shown in FIG. 10. When the process proceeds to step E in FIG. 10, the ECU 30 executes step 608 in FIG. 6B. In step 1001 subsequent to step S, the ECU 30 determines whether the acceleration "a" is higher than the acceleration threshold value CH. If it is determined that the acceleration "a" is higher than the acceleration threshold value CH, the ECU 30 makes an affirmative determination in step 1001, and executes step 1002. In step 1002, the ECU 30 sets the acceleration target value "b" to the throttle valve fully-closed time acceleration "e", and the process proceeds to step E. The acceleration threshold value CH is a positive value at which it is determined that the host vehicle 11 accelerates abruptly when the acceleration of the host vehicle 11 is higher than the acceleration threshold value CH.

If it is determined that the acceleration "a" is equal to or lower than the acceleration threshold value CH, the ECU 30 makes a negative determination in step 1001, and executes step 1003. In step 1003, the ECU 30 determines whether the acceleration "a" is higher than the acceleration threshold value CL. The acceleration threshold value CH is set to a value equal to or higher than 0 and lower than the acceleration threshold value CH (in this modified example, CL=0). If it is determined that the acceleration "a" is higher than the acceleration threshold value CL, the ECU 30 makes an affirmative determination in step 1003, and executes step 1004. Then, the ECU 30 sets the acceleration target value "b" to "b1" as shown in FIG. 11B, and the process proceeds to step E.

When the acceleration "a" is equal to or lower than the acceleration threshold value CL, the ECU 30 makes a negative determination in step 1003, and executes step 1005. In step 1005, the ECU 30 sets the acceleration target value "b" to "b2" as shown in FIG. 11C, and the process proceeds to step E. The throttle valve fully-closed time acceleration "e" is lower than 0, the acceleration target value "b1" is lower than the throttle valve fully-closed time acceleration "e", and the acceleration target value "b2" is lower than the acceleration target value "b1" (b2<b1<e<0). The acceleration target value "b1" may be lower than the acceleration target value "b2" as long as the value obtained by subtracting the acceleration target value "b1" from the throttle valve fully-closed time acceleration "e" (e−b1) is a positive value.

Figure 11A:
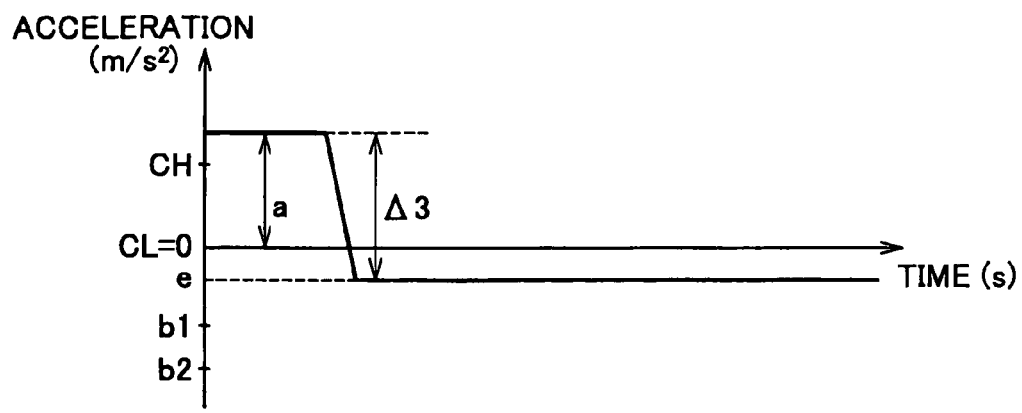
FIGS. 11A to 11C are the time-charts each showing a temporal change in the acceleration, which is caused by the alarming braking operation performed by an alarm system for a vehicle according to the modified example of the embodiment of the invention, the acceleration immediately before the alarming braking operation is started varying among FIGS. 11A to 11C.
Figure 11B:
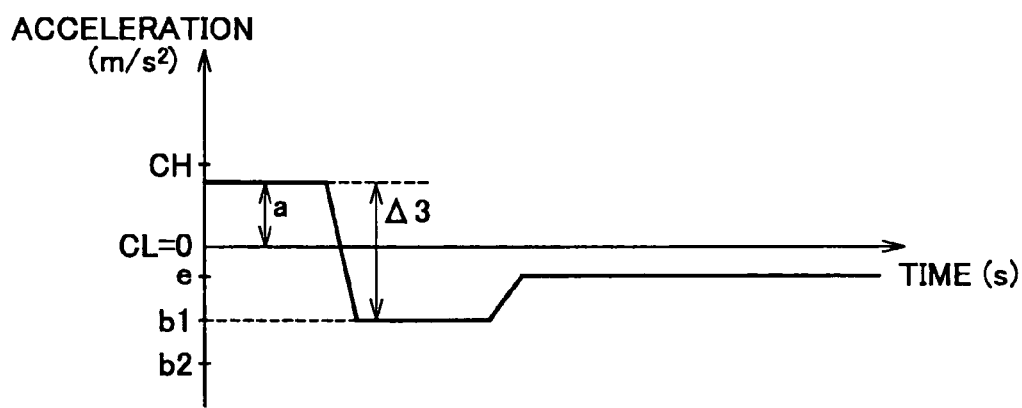
Figure 11C:
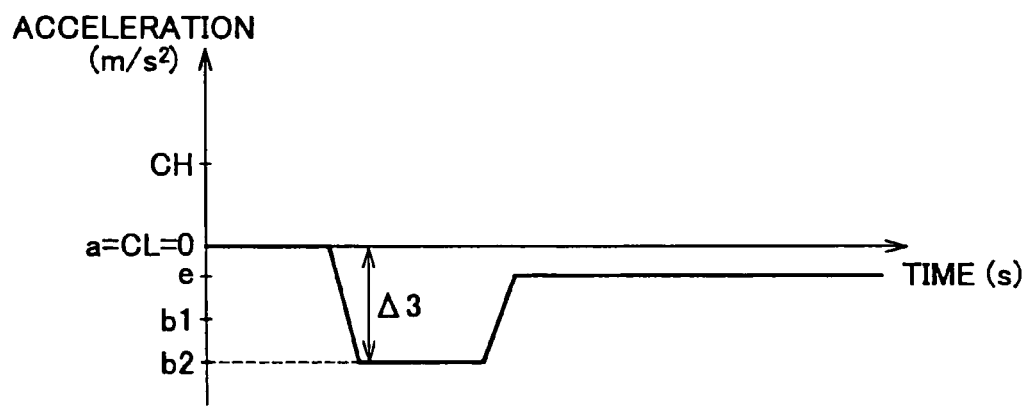

Due to the operation described so far, when the acceleration "a" is higher than the acceleration threshold value CH, the change amount Δ3 in the acceleration between before and after the alarming braking operation is started is equal to the value obtained by subtracting the throttle valve fully-closed time acceleration "e" from the acceleration "a" (a−e), as shown in FIG. 11A. When the acceleration "a" is equal to or lower than the acceleration threshold value CH and higher than the acceleration threshold value CL, as shown in FIG. 11B, the change amount Δ3 in the acceleration between before and after the alarming braking operation is started is equal to the value obtained by subtracting the acceleration target value "b1" from the acceleration "a" (a−b1). When the acceleration "a" is equal to or lower than the acceleration threshold value CL, the change amount Δ3 in the acceleration between before and after the alarming braking operation is started is equal to the value obtained by subtracting the acceleration target value "b2" from the acceleration "a" (a−b2), as shown in FIG. 11C. Accordingly, if the acceleration threshold value CH, the acceleration threshold value CL, the acceleration target values "b1" and "b2" are set to appropriate values, the acceleration is changed by an appropriate amount.

The alarm system 10 according to the embodiment of the invention determines, in step 605 in FIG. 6A, whether the acceleration "a" of the host vehicle 11 immediately before the alarming braking operation is started is higher than the acceleration threshold value "c, and calculates the target acceleration "b" by one of the two methods depending on the determination result. However, the manner in which the target acceleration "b" is calculated is not limited to this. For example, the target acceleration "b" may be calculated by subtracting the predetermined positive value X from the acceleration "a". According to this method, the amount of change in the acceleration between before and after the alarming braking operation is started is uniform. Accordingly, the impact given to the driver is also uniform.

The alarm system 10 according to the embodiment of the invention gives an impact to the driver by changing the acceleration of the host vehicle 11, thereby causing the driver to recognize that a collision between the obstacle and the host vehicle 11 may occur. In addition, when the probability of a collision between the host vehicle 11 and the obstacle is high, the alarm lamp 42 may be lighted in addition to changing the acceleration. Thus, it is possible to more easily cause the driver to recognize that a collision between the host vehicle 11 and the obstacle may occur. In addition, the braking force (braking pressure) during the alarming braking operation may be controlled in a feedback manner based on the magnitude correlation between the actual acceleration obtained from the acceleration sensor 36 and the target acceleration "b" so that the acceleration of the host vehicle 11 is equal to the target acceleration "b" during the alarming braking operation.

The alarm system 10 according to the embodiment of the invention performs the alarming braking operation when the before-collision estimated time "t" is equal to the time T1 and the driver is driving the host vehicle 11 without keeping his/her eyes on the road ahead. Alternatively, the alarming braking operation may be performed even if it is not determined that the driver is driving the host vehicle 11 without keeping his/her eyes on the road ahead. Thus, the invention is applied to a vehicle without the driver's face orientation camera 40. The alarm system 10 according to the embodiment of the invention regards the state in which the driver is driving the host vehicle 11 without keeping his/her eyes on the road ahead as the state in which the driver is driving the host vehicle 11 inappropriately. Alternatively, the alarming braking operation may be performed when another state in which the driver is driving the host vehicle 11 inappropriately is detected. For example, the degree of arousal of the driver may be detected, and the alarming braking operation may be performed if it is determined that the driver is dozing.

In addition, when the before-collision estimated time "t" is equal to the time T1 and the driver does not intend to decelerate the host vehicle 11, the alarming braking operation may be performed. In other words, when the driver intends to decelerate the host vehicle 11, namely, when the braking operation is performed by the driver, the alarming braking operation may be restricted. Thus, it is possible to prevent the situation in which a sense of discomfort is given to the driver by performing the alarming braking operation although the driver recognizes that a collision between the host vehicle 11 and an obstacle may occur and performs the braking operation.

Steps 508 to 510 in the automatic braking operation start routine shown in FIG. 5 in the embodiment of the invention may function as a collision probability index value calculation unit according to the invention. The alarming braking operation start routine shown in FIGS. 6A and 6B and the alarming braking operation ending routine shown in FIG. 7 may function as an alarming braking operation performing unit according to the invention.

In addition, steps 604 to 607 in the alarming braking operation start routine shown in FIG. 6A may function as a target acceleration setting unit according to the invention. Steps 608 to 612 in the alarming braking operation start routine shown in FIG. 6B and the alarming braking operation ending routine shown in FIG. 7 may function as an acceleration control unit according to the invention.

In addition, step 608 in the alarming braking operation start routine shown in FIG. 6B in the embodiment of the invention may function as a drive power control unit according to the invention. Steps 609 to 611 and the alarming braking operation ending routine shown in FIG. 7 may function as a braking force control unit according to the invention.

While the invention has been described with reference to an example embodiment thereof, it should be understood that the invention is not limited to the example embodiment or construction. To the contrary, the invention is intended to cover various modifications and equivalent arrangements. In addition, while the various elements of the example embodiment are shown in various combinations and configurations, which are example, other combinations and configurations, including more, less or only a single element, are also within the scope of the invention.

The invention claimed is:

1. An alarm system for a vehicle that performs an alarming braking operation by changing at least one of a drive power for driving a host vehicle and a braking force applied to the host vehicle when a probability of collision between the host vehicle and an obstacle is high, the alarming braking operation is configured to cause a driver to recognize that a collision may occur, the alarm system comprising:
   a collision probability index value calculation unit that calculates a collision probability index value corresponding to the probability of collision between the host vehicle and the obstacle;
   an acceleration detecting unit that detects an actual acceleration of the host vehicle;
   a target acceleration setting unit that is programmed to set a target acceleration, the target acceleration being determined based on an actual acceleration, the actual acceleration being detected by the acceleration detecting unit at the time when the collision probability index value reaches the predetermined threshold value, the target acceleration being maintained during the alarming braking operation so that an amount of change between the target acceleration and the actual acceleration when the collision probability index value reaches the predetermined threshold value becomes a predetermined value that is constant during the alarming braking operation;
   an acceleration control unit that controls at least one of the drive power for driving the host vehicle and the braking force applied to the host vehicle so that the target acceleration set by the target acceleration setting unit is achieved and maintained when the collision probability index value reaches a predetermined threshold value.

2. The alarm system for a vehicle according to claim 1, wherein the acceleration control unit includes a drive power control unit that sets the drive power to a value at which a negative acceleration is applied to the host vehicle.

3. The alarm system for a vehicle according to claim 2, wherein
the drive power control unit sets the drive power for driving the host vehicle to a value at which a resistance to running of the host vehicle is generated during the alarming braking operation and after the alarming braking operation ends.

4. The alarm system for a vehicle according to claim 3, wherein
the target acceleration setting unit sets the target acceleration to an acceleration that is achieved at the drive power for driving the vehicle, at which the resistance to running of the host vehicle is generated.

5. The alarm system for a vehicle according to claim 1, wherein
the target acceleration setting unit sets the target acceleration to a value calculated by subtracting a predetermined value from the actual acceleration of the host vehicle when the collision probability index value reaches the predetermined threshold value.

6. The alarm system for a vehicle according to claim 1, wherein
the collision probability index value calculation unit calculates, as the collision probability index value, a before-collision estimated time that is a duration of time before a collision between the host vehicle and an obstacle that is present in a road on which the host vehicle will travel, and
the alarming braking operation is initiated after determining that the collision probability index value reaches the predetermined threshold value when the calculated before-collision estimated time is equal to or shorter than a predetermined value.

7. The alarm system for a vehicle according to claim 1, further comprising:
a damage minimizing braking operation unit that applies a damage minimizing braking force to the host vehicle after a predetermined time has elapsed since the alarming braking operation is performed.

8. The alarm system for a vehicle according to claim 1, further comprises:
an inattentive driving determination unit that determines whether the driver is driving the host vehicle without keeping his/her eyes on a road ahead, wherein
the target acceleration setting unit sets the target acceleration when it is determined that the driver is driving the host vehicle without keeping his/her eyes on the road ahead.

9. The alarm system for a vehicle according to claim 1, further comprises:
an arousal detection unit that determines whether the driver is dozing, wherein
the target acceleration setting unit sets the target acceleration when it is determined that the driver is dozing.

10. The alarm system for a vehicle according to claim 1, wherein
the target acceleration setting unit sets the target acceleration only if no braking operation is performed when the collision probability index value reaches the predetermined threshold value.

11. The alarming system for a vehicle according to claim 1, wherein:
the predetermined value is set a first change amount when the actual acceleration detected by the acceleration detecting unit is equal to or lower than a acceleration threshold value;
the predetermined value is set a second change amount when the actual acceleration detected by the acceleration detecting unit is higher than the acceleration threshold value; and
the second change amount is larger than the first change amount.

\* \* \* \* \*